United States Patent
Kim et al.

(10) Patent No.: US 11,663,747 B2
(45) Date of Patent: *May 30, 2023

(54) METHODS AND APPARATUSES FOR PERFORMING ARTIFICIAL INTELLIGENCE ENCODING AND ARTIFICIAL INTELLIGENCE DECODING ON IMAGE

(71) Applicant: SAMSUNG ELECTRONICS CO., LTD., Suwon-si (KR)

(72) Inventors: Jaehwan Kim, Suwon-si (KR); Jongseok Lee, Suwon-si (KR); Sunyoung Jeon, Suwon-si (KR); Kwangpyo Choi, Suwon-si (KR); Minseok Choi, Suwon-si (KR); Quockhanh Dinh, Suwon-si (KR); Youngo Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/383,533

(22) Filed: Jul. 23, 2021

(65) Prior Publication Data

US 2021/0350586 A1   Nov. 11, 2021

Related U.S. Application Data

(63) Continuation of application No. 17/082,848, filed on Oct. 28, 2020, now Pat. No. 11,170,534, which is a
(Continued)

(30) Foreign Application Priority Data

Oct. 19, 2018  (KR) .................. 10-2018-0125406
May 7, 2019   (KR) .................. 10-2019-0053248
May 28, 2019  (KR) .................. 10-2019-0062583

(51) Int. Cl.
*G06T 9/00*       (2006.01)
*G06T 3/40*       (2006.01)
(Continued)

(52) U.S. Cl.
CPC ............ *G06T 9/002* (2013.01); *G06T 3/4046* (2013.01); *G06V 10/82* (2022.01); *H04N 19/85* (2014.11); *G06T 2207/20081* (2013.01)

(58) Field of Classification Search
CPC .................. G06T 9/002; G06T 3/4046; G06T 2207/20081; H04N 19/85; G06V 10/82
See application file for complete search history.

(56) References Cited

U.S. PATENT DOCUMENTS

| 7,295,608 B2 | 11/2007 | Reynolds et al. |
| 7,308,031 B2 | 12/2007 | Yamaguchi et al. |

(Continued)

FOREIGN PATENT DOCUMENTS

| CN | 104754357 A | 7/2015 |
| CN | 108022212 A | 5/2018 |

(Continued)

OTHER PUBLICATIONS

Notice of Amendment Dismissal Communication dated Dec. 17, 2021 issued by the Korean Patent Office in counterpart Korean Application No. 10-2019-0041109.
(Continued)

*Primary Examiner* — Shefali D Goradia
(74) *Attorney, Agent, or Firm* — Sughrue Mion, PLLC

(57) ABSTRACT

Provided is an artificial intelligence (AI) decoding apparatus includes: a memory storing one or more instructions; and a processor configured to execute the one or more instructions stored in the memory, the processor is configured to: obtain AI data related to AI down-scaling an original image to a first image; obtain image data corresponding to an encoding
(Continued)

result on the first image; obtain a second image corresponding to the first image by performing a decoding on the image data; obtain deep neural network (DNN) setting information among a plurality of DNN setting information from the AI data; and obtain, by an up-scaling DNN, a third image by performing the AI up-scaling on the second image, the up-scaling DNN being configured with the obtained DNN setting information, wherein the plurality of DNN setting information comprises a parameter used in the up-scaling DNN, the parameter being obtained through joint training of the up-scaling DNN and a down-scaling DNN, and wherein the down-scaling DNN is used to obtain the first image from the original image.

10 Claims, 13 Drawing Sheets

Related U.S. Application Data continuation of application No. 16/570,057, filed on Sep. 13, 2019, now Pat. No. 10,825,203, which is a continuation of application No. PCT/KR2019/004171, filed on Apr. 8, 2019.

(51) Int. Cl.
  *H04N 19/85* (2014.01)
  *G06V 10/82* (2022.01)

(56) References Cited

U.S. PATENT DOCUMENTS

| | | | |
|---|---|---|---|
| 7,400,588 B2 | 7/2008 | Izzat et al. | |
| 8,184,164 B2 | 5/2012 | Yang et al. | |
| 8,385,406 B2 | 2/2013 | Cho et al. | |
| 9,251,572 B2 | 2/2016 | Shu et al. | |
| 9,602,814 B2 | 3/2017 | Bhagavathy et al. | |
| 9,613,042 B1 | 4/2017 | Joseph et al. | |
| 9,679,213 B2 | 6/2017 | Yang et al. | |
| 9,749,580 B2 | 8/2017 | Suh et al. | |
| 9,936,208 B1 | 4/2018 | Brailovskiy et al. | |
| 10,148,723 B2 | 12/2018 | Falvo | |
| 10,218,971 B2 | 2/2019 | Dong et al. | |
| 10,225,607 B1 | 3/2019 | Bai et al. | |
| 10,423,843 B2 | 9/2019 | Biemer et al. | |
| 10,512,116 B2 | 12/2019 | Chang et al. | |
| 10,817,989 B2 * | 10/2020 | Kim | G06T 9/002 |
| 10,817,990 B1 | 10/2020 | Yang et al. | |
| 10,819,992 B2 | 10/2020 | Park et al. | |
| 10,825,141 B1 | 11/2020 | Park et al. | |
| 10,950,009 B2 * | 3/2021 | Dinh | G06N 3/084 |
| 10,986,356 B2 | 4/2021 | Kim et al. | |
| 11,200,639 B1 | 12/2021 | Kim et al. | |
| 11,200,702 B2 | 12/2021 | Dinh et al. | |
| 2005/0129306 A1 | 6/2005 | Wang et al. | |
| 2007/0189392 A1 | 8/2007 | Tourapis et al. | |
| 2008/0140594 A1 | 6/2008 | Tannhof et al. | |
| 2009/0148054 A1 | 6/2009 | Kim et al. | |
| 2011/0026819 A1 | 2/2011 | Lee et al. | |
| 2011/0032986 A1 | 2/2011 | Banger et al. | |
| 2011/0090950 A1 | 4/2011 | Bush | |
| 2012/0026288 A1 | 2/2012 | Tourapis et al. | |
| 2012/0230604 A1 | 9/2012 | Yamajo et al. | |
| 2012/0275511 A1 | 11/2012 | Shemer et al. | |
| 2013/0282917 A1 | 10/2013 | Reznik et al. | |
| 2014/0037015 A1 | 2/2014 | Ye et al. | |
| 2014/0086319 A1 | 3/2014 | Xu et al. | |
| 2014/0177706 A1 | 6/2014 | Fernandes et al. | |
| 2015/0042878 A1 | 2/2015 | Jeon et al. | |
| 2015/0256828 A1 | 9/2015 | Dong et al. | |
| 2015/0334416 A1 | 11/2015 | Holcomb et al. | |
| 2016/0163023 A1 | 6/2016 | Wey et al. | |
| 2016/0316508 A1 | 10/2016 | Hong et al. | |
| 2016/0328630 A1 | 11/2016 | Han et al. | |
| 2016/0360155 A1 | 12/2016 | Civanlar et al. | |
| 2017/0039456 A1 | 2/2017 | Saberian et al. | |
| 2017/0104993 A1 | 4/2017 | Jeong et al. | |
| 2017/0208345 A1 | 7/2017 | Jeong et al. | |
| 2017/0215225 A1 | 7/2017 | Yi et al. | |
| 2017/0287109 A1 | 10/2017 | Tasfi | |
| 2017/0345130 A1 | 11/2017 | Wang et al. | |
| 2017/0347061 A1 | 11/2017 | Wang et al. | |
| 2018/0063549 A1 | 3/2018 | Amer | |
| 2018/0131953 A1 | 5/2018 | Wang et al. | |
| 2018/0139458 A1 | 5/2018 | Wang et al. | |
| 2018/0174275 A1 | 6/2018 | Bourdev et al. | |
| 2018/0176570 A1 | 6/2018 | Rippel et al. | |
| 2018/0239972 A1 | 8/2018 | Biemer et al. | |
| 2018/0249158 A1 | 8/2018 | Huang et al. | |
| 2018/0288440 A1 | 10/2018 | Chao | |
| 2018/0293706 A1 | 10/2018 | Viswanathan et al. | |
| 2018/0302456 A1 | 10/2018 | Katsavounidis et al. | |
| 2019/0013822 A1 | 1/2019 | Marpe et al. | |
| 2019/0045248 A1 | 2/2019 | Shen et al. | |
| 2019/0045251 A1 | 2/2019 | Shen et al. | |
| 2019/0075301 A1 | 3/2019 | Chou et al. | |
| 2019/0166379 A1 | 5/2019 | Michelini et al. | |
| 2019/0180189 A1 | 6/2019 | Biesemann et al. | |
| 2019/0230354 A1 | 7/2019 | Kim | |
| 2019/0311259 A1 | 10/2019 | Cricri et al. | |
| 2020/0053408 A1 | 2/2020 | Park et al. | |
| 2020/0126186 A1 | 4/2020 | Kim et al. | |
| 2020/0162789 A1 | 5/2020 | Ma et al. | |
| 2020/0184314 A1 | 6/2020 | Krishnamoorthy | |
| 2020/0184685 A1 | 6/2020 | Kim et al. | |
| 2020/0193647 A1 | 6/2020 | Jeon et al. | |
| 2020/0258197 A1 | 8/2020 | Tai et al. | |
| 2020/0382792 A1 | 12/2020 | Gao et al. | |
| 2020/0382793 A1 | 12/2020 | Gao | |
| 2021/0042453 A1 | 2/2021 | Yoshiyama et al. | |
| 2021/0058653 A1 | 2/2021 | Jang | |
| 2021/0073947 A1 | 3/2021 | Park et al. | |
| 2021/0125380 A1 | 4/2021 | Lee et al. | |

FOREIGN PATENT DOCUMENTS

| | | |
|---|---|---|
| JP | 2008-527810 A | 7/2008 |
| JP | 2009-540625 A | 11/2009 |
| JP | 2012-191250 A | 10/2012 |
| KR | 10-0224801 B1 | 10/1999 |
| KR | 10-0286443 B1 | 4/2001 |
| KR | 10-0657280 B1 | 12/2006 |
| KR | 10-1375663 B1 | 4/2014 |
| KR | 10-1425602 B1 | 7/2014 |
| KR | 10-2014-0145560 A | 12/2014 |
| KR | 10-2015-0041098 A | 4/2015 |
| KR | 10-2015-0060906 A | 6/2015 |
| KR | 10-2015-0087103 A | 7/2015 |
| KR | 10-2015-0135637 A | 12/2015 |
| KR | 10-2016-0036662 A | 4/2016 |
| KR | 10-2016-0080929 A | 7/2016 |
| KR | 10-2016-0131848 A | 11/2016 |
| KR | 10-2016-0132331 A | 11/2016 |
| KR | 10-2017-0059040 A | 5/2017 |
| KR | 10-2017-0100045 A | 9/2017 |
| KR | 10-2018-0001428 A | 1/2018 |
| KR | 10-2018-0052651 A | 5/2018 |
| KR | 10-1885855 B1 | 8/2018 |
| KR | 10-2018-0100976 A | 9/2018 |
| KR | 10-2018-0108288 A | 10/2018 |
| KR | 102022648 B1 | 9/2019 |
| KR | 10-2019-0130479 A | 11/2019 |
| KR | 10-2020-009118 A | 1/2020 |
| WO | 2012/058394 A1 | 5/2012 |
| WO | 2016/132145 A1 | 8/2016 |
| WO | 2016/132148 A1 | 8/2016 |
| WO | 2016/132152 A1 | 8/2016 |
| WO | 2016/205733 A1 | 12/2016 |
| WO | 2017/036370 A1 | 3/2017 |
| WO | 2017/144881 A1 | 8/2017 |
| WO | 2018/091486 A1 | 5/2018 |
| WO | 2018/140294 A1 | 8/2018 |

(56) References Cited

FOREIGN PATENT DOCUMENTS

| WO | 2018/140596 A2 | 8/2018 |
|---|---|---|
| WO | 2018/140596 A3 | 8/2018 |
| WO | 2018/143992 A1 | 8/2018 |
| WO | 2018/170393 A2 | 9/2018 |
| WO | 2018/170393 A3 | 9/2018 |
| WO | 2018/170393 A9 | 9/2018 |
| WO | 2019/220095 A1 | 11/2019 |
| WO | 2020/080709 A1 | 4/2020 |
| WO | 2020/080765 A1 | 4/2020 |

OTHER PUBLICATIONS

Communication dated Nov. 8, 2021 issued by the Korean Patent Office in counterpart Korean Application No. 10-2021-0119183.
Notice of Final Rejection Communication dated Dec. 17, 2021 issued by the Korean Patent Office in counterpart Korean Application No. 10-2019-0041109.
Communication dated Oct. 4, 2021 issued by the European Intellectual Property Office in counterpart European Application No. 19873223.2.
Mehdi S. M. Sajjadi et al., "EnhanceNet: Single Image Super-Resolution Through Automated Texture Synthesis", IEEE International Conference on Computer Vision, 2017, 10 pages total, XP033283324.
Tiantong Guo et al., "Deep Learning Based Image Super-Resolution With Coupled Backpropagation", IEEE, 2016, 5 pages total, XP033087061.
Haitam Ben Yahia et al., "Frame Interpolation using Convolutional Neural Networks on 2D animation", Universiteit van Amsterdam, 2016, 20 pages total.
Slawomir Skoneczny et al., "Classical and neural methods of image sequence interpolation", Proceedings of SPIE, vol. 4535, 2000, 15 pages total.
Viet-Anh Nguyen et al., "Adaptive Downsampling/Upsampling for Better Video Compression at Low Bit Rate", IEEE, 2008, 4 pages total, XP031392300.
Communication dated Aug. 19, 2019 issued by the European Intellectual Property Office in counterpart European Application No. 19183429.0.
Communication dated Jul. 11, 2018 issued by the International Searching Authority in counterpart Application No. PCT/KR2018/001542 (PCT/ISA/220, PCT/ISA/210, and PCT/ISA/237).
Communication dated Apr. 5, 2018 issued by the International Searching Authority in counterpart Application No. PCT/KR2017/007258 (PCT/ISA/220, PCT/ISA/210, and PCT/ISA/237).
Yuanying Dai et al., "A Convolutional Neural Network Approach for Post-Processing in HEVC Intra Coding", arXiv:1608.06690v2, Oct. 29, 2016, 12 pages total.
Woon-Sung Park et al., "Cnn-Based In-Loop Filtering for Coding Efficiency Improvement", IEEE, 2016, 5 pages total.
Feng Jiang et al., "An End-to-End Compression Framework Based on Convolutional Neural Networks", IEEE Transactions on Circuits and Systems for Video Technology, Aug. 2, 2017, 13 pages total, XP055610399.
Communication dated Jun. 1, 2021 issued by the International Searching Authority in counterpart Application No. PCT/KR2021/002204 (PCT/ISA/220, PCT/ISA/210, and PCT/ISA/237).
Communication dated Jun. 3, 2021 issued by the Korean Intellectual Property Office in counterpart Korean Application No. 10-2019-0041102.
Communication dated Jun. 7, 2021 issued by the Indian Patent Office in counterpart Indian Application No. 201924041670.
Communication dated Jun. 21, 2021 issued by the Korean Intellectual Property Office in counterpart Korean Application No. 10-2019-0062583.
Communication dated Jun. 21, 2021 issued by the Korean Intellectual Property Office in counterpart Korean Application No. 10-2019-0041109.
Communication dated Jun. 21, 2021 issued by the Korean Intellectual Property Office in counterpart Korean Application No. 10-2019-0066057.
Communication dated Jun. 29, 2021 issued by the European Intellectual Property Office in counterpart European Application No. 19872393.4.
Communication dated Jun. 29, 2021 issued by the European Intellectual Property Office in counterpart European Application No. 19873762.9.
Communication dated Jul. 5, 2021 issued by the European Intellectual Property Office in counterpart European Application No. 19873269.5.
Communication dated Jul. 20, 2021 issued by the European Intellectual Property Office in counterpart European Application No. 19874036.7.
Yue Li et al., "Convolutional Neural Network-Based Block Up-Sampling for Intra Frame Coding", IEEE Transactions on Circuits and Systems for Video Technology, vol. 28, No. 9, Sep. 2018, pp. 2316-2330, 15 pages total, XP055610817.
"Machine learning—Why do we need floats for using neural networks?—Artificial Intelligence Stack Exchange", Artificial Intelligence, Aug. 2018, pp. 1-8, 8 pages total, XP055822829.
Suyog Gupta et al., "Deep Learning with Limited Numerical Precision", arxiv.org, Feb. 9, 2015, pp. 1-10, 10 pages total, XP080677454.
Johnston, N., et al., "Improved Lossy Image Compression with Priming and Spatially Adaptive Bit Rates for Recurrent Networks", Proceedings of the IEEE Conference on CVPR, Computer Vision Foundation, Jun. 23, 2018, pp. 4385-4393.
Tao, W., et al., "An End-to-End Compression Framework Based on Convolutional Neural Networks", 2017 Data Compression Conference, p. 463.
Theis, L., et al., "Lossy Image Compression with Compressive Autoencoders", arXiv:1703.00395v1 [stat.ML], Mar. 1, 2017, Published as a conference paper at ICLR 2017, pp. 1-19.
Communication dated Apr. 27, 2021 issued by the Korean Intellectual Property Office in application No. 10-2020-0022379.
Communication dated Mar. 8, 2021 issued by the Intellectual Property India Patent Office in application No. 201927038419.
Mao, et al., "Image Restoration Using Convolutional Auto-encoders with Symmetric Skip Connections", Cornell University, 2016, 22 pages total.
Communication dated Dec. 11, 2020, from the European Patent Office in European Application No. 19 183 429.0.
Communication dated Dec. 11, 2020, issued by the Korean Intellectual Property Office in Korean Application No. 10-2019-0041109.
Communication dated Dec. 16, 2020, issued by the Korean Intellectual Property Office in Korean Application No. 10-2019-0062583.
Communication dated Dec. 22, 2020, issued by the Korean Intellectual Property Office in Korean Application No. 10-2019-0066057.
Communication dated Jan. 12, 2021, issued by the Korean Intellectual Property Office in Korean Application No. 10-2019-0078343.
Communication dated Jan. 13, 2021, issued by the Korean Intellectual Property Office in Korean Application No. 10-2019-0078344.
Communication dated Jan. 14, 2021, issued by the Korean Intellectual Property Office in Korean Application No. 10-2020-7000378.
Communication dated Jan. 5, 2021, issued by the Korean Intellectual Property Office in Korean Application No. 10-2019-0076569.
Communication dated Jan. 6, 2021, issued by the Korean Intellectual Property Office in Korean Application No. 10-2019-0077250.
Communication dated Dec. 10, 2020, issued by the Korean Intellectual Property Office in Korean Application No. 10-2019-0041102.
Seunghyun Cho et al., "A Technical Analysis on Deep Leaning based Image and Video Compression", Journal of Broadcast Engineering Society, Korean Institute of Broadcast and Media Engineers, May 2018, vol. 23, No. 3, pp. 383-394 (12 pages total).

(56) References Cited

OTHER PUBLICATIONS

Nick Johnston et al., "Improved Lossy Image Compression with Priming and Spatially Adaptive Bit Rates for Recurrent Networks", Cornell University, Mar. 29, 2017, pp. 1-9 (9 pages total).
Jiwon Kim et al., "Deeply-Recursive Convolutional Network for Image Super-Resolution", Cornell University, Nov. 11, 2016, pp. 1-9 (9 pages total).
Suo Qiu et al., "FReLU: Flexible Rectified Linear Units for Improving Convolutional Neural Networks" Cornell University, Jan. 29, 2018, pp. 1-6 (6 pages total).
Christos Louizos, et al. Relaxed Quantization for Discretized Neural networks, Cornell University, Oct. 3, 2018, pp. 1-14.
Communication (PCT/ISA/220, PCT/ISA/210 & PCT/ISA/237) dated Dec. 4, 2019 by the International Searching Authority in counterpart International Patent Application No. PCT/KR2019/010645.
Communication (PCT/ISA/220, PCT/ISA/210 & PCT/ISA/237) dated Jan. 23, 2020 by the International Searching Authority in counterpart International Patent Application No. PCT/KR2019/012836.
Communication (PCT/ISA/220, PCT/ISA/210 & PCT/ISA/237) dated Jan. 29, 2020 by the International Searching Authority in counterpart International Patent Application No. PCT/KR2019/013595.
Communication (PCT/ISA/220, PCT/ISA/210 & PCT/ISA/237) dated Jan. 30, 2020 by the International Searching Authority in counterpart International Patent Application No. PCT/KR2019/013421.
Communication (PCT/ISA/220, PCT/ISA/210 & PCT/ISA/237) dated Feb. 5, 2020 by the International Searching Authority in counterpart International Patent Application No. PCT/KR2019/013483.
Communication (PCT/ISA/220, PCT/ISA/210 & PCT/ISA/237) dated Feb. 21, 2020 by the International Searching Authority in counterpart International Patent Application No. PCT/KR2019/013733.
Jeong, Woojin et al., "Efficient Super-Resolution Method for Single Image based on Deep Neural Networks", Journal of The Institute of Electronics and Information Engineers, vol. 55, No. 6, pp. 779-786, Jun. 2018. (10 pages total).
Sergey Ioffe et al., "Batch Normalization: Accelerating Deep Network Training by Reducing Internal Covariate Shift", Proceedings of the 32nd International Conference on Machine Learning 2015, vol. 37, pp. 448-456, 2015. (11 pages total).
Seungbin Lee et al., "Performance Analysis of Convolution Neural Network and Generative Adversarial Network for Super Resolution", Journal of the Korean Institute of Information Scientists and Engineers, Jun. 2017, pp. 931-933. (6 pages total).
International Search Report and Written Opinion (PCT/ISA/210 and PCT/ISA/237), dated Jan. 22, 2020 by International Searching Authority in International Application No. PCT/KR2019/013344.
Sehwan Ki et al. "A Study on the Convolution Neural Network based on Blind High Dynamic Range Image Quality Assessment" The Journal of Korean Institute of Communications and Information Sciences, Jan. 2018, (5 pages total).
Patrick Le Callet et al. "A Convolutional Neural Network Approach for Objective Video Quality Assessment" IEEE Transactions on Neural Networks, vol. 17, No. 5, Sep. 2006, (14 pages).
Michalis Giannopoulos et al. "Convolutional Neural Networks for Video Quality Assessment" Sep. 26, 2018, [retrieved from https://arxiv.org/abs/1809.10117v1] (14 pages total).
International Search Report and Written Opinion (PCT/ISA/210 and PCT/ISA/237), dated Aug. 6, 2019 by International Searching Authority in International Application No. PCT/KR2019/004171.
International Search Report and Written Opinion (PCT/ISA/210 and PCT/ISA/237), dated Jan. 7, 2020 by International Searching Authority in International Application No. PCT/KR2019/012510.

Jiang, Feng, et al. "An end-to-end compression framework based on convolutional neural networks." IEEE Transactions on Circuits and Systems for Video Technology 28.10 (2017): 3007-3018. (Year: 2017).
Gorodilov, Artem, Dmitriy Gavrilov, and Dmitriy Schelkunov. "Neural Networks for Image and Video Compression." 2018 International Conference on Artificial Intelligence Applications and Innovations (IC-AIAI). IEEE. (Year: 2018).
Zhang, Xiangjun, and Xiaolin Wu. "Can lower resolution be better?. " Data Compression Conference (Dec. 2008). IEEE, 2008. (Year: 2008).
Kim, Jaehwan, et al. "Dynamic frame resizing with convolutional neural network for efficient video compression." Applications of Digital Image Processing XL. vol. 10396. International Society for Optics and Photonics, 2017. (Year: 2017).
Afonso, Mariana, Fan Zhang, and David R. Bull. "Spatial resolution adaptation framework for video compression." Applications of Digital Image Processing XLI. vol. 10752. International Society for Optics and Photonics, 2018. (Year: 2018).
"Several, adj., adv., and n." OED Online, Oxford University Press, Mar. 2020, oed.com/view/Entry/176914. Accessed Mar. 27, 2020. (Year: 2020).
Kim, Heewon, etal. "Task-Aware Image Downscaling." European Conference on Computer Vision. Springer, Cham, 2018. (Year: 2018).
Li, Yue, et al. "Learning a convolutional neural network for image compact-resolution." IEEE Transactions on Image Processing 28.3 (2018): 1092-1107. (Year: 2018).
International Search Report (PCT/ISA/210) and Written Opinion (PCT/ISA/237) issued by the International Searching Authority in International Application No. PCT/KR2021/002204, dated Jun. 1, 2021.
Notice of Allowance dated Jul. 27, 2021, issued by the Korean Intellectual Property Office in Korean Application No. 10-2020-0022379.
Communication dated Jun. 7, 2021, from the Intellectual Property Office of India in Application No. 201924041670.
Decision to Refuse dated Aug. 9, 2021, issued by the Korean Intellectual Property Office in Korean Application No. 10-2019-0062583.
Decision to Refuse dated Jun. 21, 2021, issued by the Korean Intellectual Property Office in Korean Application No. 10-2019-0062583.
Decision to Refuse dated Jun. 21, 2021, issued by the Korean Intellectual Property Office in Korean Application No. 10-2019-0066057.
Decision to Refuse dated Aug. 9, 2021, issued by the Korean Intellectual Property Office in Korean Application No. 10-2019-0066057.
Communication dated Jun. 29, 2021, from the European Patent Office in European Application No. 19872393.4.
Decision to Refuse dated Jun. 3, 2021, issued by the Korean Intellectual Property Office in Korean Application No. 10-2019-0041102.
Communication dated Jun. 21, 2021, issued by the Korean Intellectual Property Office in Korean Application No. 10-2019-0041109.
Communication dated Jul. 20, 2021, from the European Patent Office in European Application No. 19874036.7.
Decision to Refuse dated Jul. 21, 2021, issued by the Korean Intellectual Property Office in Korean Application No. 10-2019-0077250.
Communication dated Jul. 5, 2021, from the European Patent Office in European Application No. 19873269.5.
Decision to Refuse dated Jul. 21, 2021, issued by the Korean Intellectual Property Office in Korean Application No. 10-2019-0076569.
Communication dated Jun. 29, 2021, from the European Patent Office in European Application No. 19873762.9.
Communication dated May 24, 2022, issued by the Korean Intellectual Property Office in Korean Patent English Application No. 10-2021-0119183.

(56) References Cited

OTHER PUBLICATIONS

Communication dated Feb. 21, 2022, issued by the Korean Intellectual Property Office in Korean Patent Application No. 10-2019-0041109.
Communication dated Feb. 21, 2022, issued by the Korean Intellectual Property Office in Korean Patent Application No. 10-2019-0066057.
Communication dated Jan. 12, 2022, issued by the China National Intellectual Property Administration in counterpart Chinese Application No. 201880013752.8.
Communication dated Sep. 29, 2022, issued by the European Patent Office in counterpart European Application No. 19873871.8.
Sun et al., "Pyramid Embedded Generative Adversarial Network for Automated Font Generation," 2018 24th International Conference on Pattern Recognition (ICPR), Aug. 20-24, 2018, pp. 976-981, 2018, XP033457235.
Yasrab et al., "SCNet: A Simplified Encoder-Decoder CNN for Semantic Segmentation," 2016 5th International Conference on Computer Science and Network Technology (ICCSNT), pp. 785-789, Dec. 10, 2016, XP033227705.
Communication dated Oct. 5, 2022, issued by the European Patent Office in counterpart European Application No. 19873877.5.
Communication dated Oct. 17, 2022, issued by the European Patent Office in counterpart European Application No. 19872933.7.
Seo et al., "Deep HVS-IQA Net: Human Visual System Inspired Deep Image Quality Assessment Networks," Feb. 14, 2019, Total 20 pages, XP081029095.
Kim et al., "Deep Video Quality Assessor: From Spatio-Temporal Visual Sensitivity to a Convolutional Neural Aggregation Network," pp. 224-241, Oct. 6, 2018, XP047488288.
Akyazi et al., "A new objective metric to predict image quality using deep neural networks," Proceedings of SPIE, vol. 10752, Sep. 17, 2018, Total 14 pages, XP060110691.
Chandler et al., "Most apparent distortion: full-reference image quality assessment and the role of strategy," Journal of Electronic Imaging, vol. 19, No. 1, Jan. 1, 2010, Total 21 pages, XP055539556.
Sabour et al., "Dynamic Routing Between Capsules," Oct. 26, 2017, Total 11 pages, XP081283827.
Communication dated Jul. 15, 2022, issued by the European Patent Office in counterpart European Application No. 19872933.7.
Communication dated Sep. 22, 2022, issued by the Korean Intellectual Property Office in Korean Patent Application No. 10-2019-0062583.
Communication dated Aug. 29, 2022, issued by the Korean Intellectual Property Office in Korean Patent Application No. 10-2019-0062583.
Communication dated Sep. 22, 2022, issued by the Korean Intellectual Property Office in Korean Patent Application No. 10-2019-0077250.
Communication dated Aug. 29, 2022, issued by the Korean Intellectual Property Office in Korean Patent Application No. 10-2019-0077250.
Communication dated Sep. 22, 2022, issued by the Korean Intellectual Property Office in Korean Patent Application No. 10-2019-0076569.
Communication dated Aug. 29, 2022, issued by the Korean Intellectual Property Office in Korean Patent Application No. 10-2019-0076569.
International Telecommunication Union, ITU-T, Telecommunication Standardization Sector of ITU, "High efficiency video coding," Series H: Audiovisual and Multimedia Systems, Infrastructure of audiovisual services—Coding of moving video, H.265, Apr. 2013, Total 317 pages.
Communication dated Aug. 25, 2022, issued by the National Intellectual Property Administration of P.R. English China in counterpart Chinese Application No. 201880013752.8.
Communication dated Mar. 24, 2020, issued by the United States Patent and Trademark Office in U.S. Appl. No. 16/793,605.
Cai et al. "Deep Sampling Networks," arXiv:1712.00926v2, Mar. 2018, Total 17 pages.
Communication dated Jun. 29, 2020, issued by the United States Patent and Trademark Office in U.S. Appl. No. 16/821,609.
Chen et al., "Low bit rates image compression via adaptive block downsampling and super resolution," Journal of Electronic Imaging, vol. 25, No. 1, Jan./Feb. 2016, Total 11 pages.
Hosking et al., "An Adaptive Resolution Rate Control Method for Intra Coding in HEVC," IEEE, ICASSP 2016, pp. 1486-1490, 2016.
Li et al., "Learning a Convolutional Neural Network for Image Compact-Resolution," IEEE Transactions on Image Processing, vol. 28, No. 3, pp. 1092-1107, Mar. 2019, Total 18 pages.
Communication dated Aug. 24, 2020, issued by the United States Patent and Trademark Office in U.S. Appl. No. 16/821,686.
Colic et al., "Exploring NVIDIA-CUDA for Video Coding," Proceedings of the first annual ACM SIGMM conference on Multimedia systems, pp. 13-22, 2010.
Communication dated Apr. 27, 2020, issued by the United States Patent and Trademark Office in U.S. Appl. No. 16/821,686.
Deshpande, "A Beginner's Guide To Understanding Convolutional Neural Networks," https://adeshpande3.github.io/A-Beginner's-Guide-To-Understanding-Convolutional-Neural-Networks/, Jul. 2016, Total 17 pages.
Communication dated Jul. 30, 2020, issued by the United States Patent and Trademark Office in U.S. Appl. No. 16/656,812.
Communication dated Dec. 4, 2019, issued by the United States Patent and Trademark Office in U.S. Appl. No. 16/656,812.
ALEX, "Shallow Versus Deep Neural Networks," Introduction to Deep Learning & Neural Networks with Keras, Coursera, https://www.coursera.org/lecture/introduction-to-deep-learning-with-keras/shallow-versus-deep-neural-networks-3pKHn. Accessed Nov. 26, 2019, Total 2 pages.
Communication dated Jan. 12, 2021, issued by the United States Patent and Trademark Office in U.S. Appl. No. 17/079,773.
Communication dated Oct. 14, 2022, issued by the United States Patent and Trademark Office in U.S. Appl. No. 17/575,691.
Communication dated Mar. 13, 2020, issued by the United States Patent and Trademark Office in U.S. Appl. No. 16/781,083.
Communication dated Oct. 19, 2022, issued by the United States Patent and Trademark Office in U.S. Appl. No. 16/599,291.
Communication dated Jun. 30, 2022, issued by the United States Patent and Trademark Office in U.S. Appl. No. 16/599,291.
"Rate Control and H.264." Pixel Tools, Experts in Video Processing, © 2022, Total 11 pages.
Communication dated Oct. 27, 2021, issued by the United States Patent and Trademark Office in U.S. Appl. No. 16/599,291.
Leng et al., "Extremely Low Bit Neural Network: Squeeze the Last Bit Out with ADMM," arXiv.1707.09870v2, Sep. 2017, Total 16 pages.
Xu et al., "Efficient Deep Convolutional Neural Networks Accelerator Without Multiplication and Retraining," ICASSP 2018, pp. 1100-1104, 2018.
Elhoushi et al., "DeepShift: Towards Multiplication-Less Neural Networks," arXiv:1905.13298v2, Jun. 2019, Total 11 pages.
Guo et al., "A Survey on Methods and Theories of Quantized Neural Networks," arXiv:1808.04752v1, Aug. 2018, Total 17 pages.
Kenue et al., "Efficient Convolution Kernels for Computerized Tomography," Ultrasonic Imaging, vol. 1, pp. 232-244, 1979.
Hou et al., "Loss-Aware Weight Quantization of Deep Networks," arXiv:1802.08635v2, May 2018, Total 16 pages.
Marchesi et al., "Fast Neural Networks Without Multipliers," IEEE Transactions on Neural Networks, vol. 4, No. 1, pp. 53-62, Jan. 1993.
Communication dated Aug. 7, 2020, issued by the United States Patent and Trademark Office in U.S. Appl. No. 16/659,061.
Communication dated May 6, 2020, issued by the United States Patent and Trademark Office in U.S. Appl. No. 16/659,061.
Stockhammer, "Dynamic Adaptive Streaming over HTTP—Design Principles and Standards," Conference Paper, Feb. 2011, Total 4 pages, DOI: 10.1145/1943552.1943572.
Adhikari et al., "Unreeling Netflix: Understanding and Improving Multi-CDN Movie Delivery," 2012 Proceedings IEEE INFOCOM, 2012, Total 9 pages.
Bing, "Video Distribution and Streaming," Next-Generation Video Codling and Streaming, First Edition, 2015, Total 66 pages.

(56) References Cited

OTHER PUBLICATIONS

Communication dated Dec. 11, 2019, issued by the United States Patent and Trademark Office in U.S. Appl. No. 16/659,061.
Yeo et al. "Neural Adaptive Content-aware Internet Video Delivery," Proceedings of the 13th USENIX Symposium on Operating Systems Design and Implementation (OSDI '18), Oct. 2018, Total 21 pages.
Shuai et al., "MobiUP: An Upsampling-Based System Architecture for High-Quality Video Streaming on Mobile Devices," IEEE Transactions on Multimedia, vol. 13, No. 5, pp. 1077-1091, Oct. 2011.
Yeo et al, "How will Deep Learning Change Internet Video Delivery?," Proceedings of the 16th ACM Workshop on Hot Topics in Networks, pp. 57-64, 2017.
Communication dated Apr. 2, 2021, issued by the United States Patent and Trademark Office in U.S. Appl. No. 17/080,543.
Sani et al., "Adaptive Bitrate Selection: A Survey," IEEE Communications Surveys & Tutorials, vol. 19, No. 4, pp. 2985-3014, 2017.
Communication dated May 8, 2020, issued by the United States Patent and Trademark Office in U.S. Appl. No. 16/743,613.
Communication dated Sep. 9, 2022, issued by the United States Patent and Trademark Office in U.S. Appl. No. 17/498,859.
Communication dated Nov. 21, 2022, issued by the United States Patent and Trademark Office in U.S. Appl. No. 17/286,743.
Communication dated May 25, 2022, issued by the United States Patent and Trademark Office in U.S. Appl. No. 17/286,743.
Communication dated Jun. 10, 2021, issued by the United States Patent and Trademark Office in U.S. Appl. No. 17/184,250.
Written Decision on Registration, dated Jan. 20, 2023, issued by the Korean Intellectual Property Office, Application No. 10-2019-0076569.
Indian Office Action, dated Dec. 28, 2022, issued by the Intellectual Property India, Application No. 202117018613.
Indian Office Action, dated Dec. 23, 2022, issued by the Intellectual Property India, Application No. 202117016596.
Indian Office Action, dated Dec. 26, 2022, issued by the Intellectual Property India, Application No. 202117021685.
Indian Office Action, dated Jan. 4, 2023, issued by the Intellectual Property India, Application No. 202117022187.
Indian Office Action, dated Dec. 28, 2022, issued by the Intellectual Property India, Application No. 202117019847.
European Office Action, dated Mar. 7, 2023, issued by the European Patent Office, Application No. 19873762.9.
Notice of Allowance, dated Feb. 10, 2023, issued by the United States Patent and Trademark Office, U.S. Appl. No. 17/575,691.

\* cited by examiner

FIG. 5

| IMAGE-RELATED INFORMATION | DNN SETTING INFORMATION |
|---|---|
| SD, 10Mbps, AV1 | A DNN SETTING INFORMATION |
| HD, 15Mbps, H.264 | B DNN SETTING INFORMATION |
| Full HD, 20Mbps, HEVC | C DNN SETTING INFORMATION |
| Full HD, 15Mbps, HEVC | D DNN SETTING INFORMATION |

METHODS AND APPARATUSES FOR PERFORMING ARTIFICIAL INTELLIGENCE ENCODING AND ARTIFICIAL INTELLIGENCE DECODING ON IMAGE

CROSS-REFERENCE TO RELATED APPLICATION(S)

This application is a Continuation Application of U.S. application Ser. No. 17/082,848, filed on Oct. 28, 2020, which is a Continuation Application of U.S. application Ser. No. 16/570,057, filed on Sep. 13, 2019, now U.S. Pat. No. 10,825,203, issued Nov. 3, 2020, which is a Continuation Application of International Application No. PCT/KR2019/004171, filed on Apr. 8, 2019, and claims priorities under 35 U.S.C. § 119 to Korean Patent Application No. 10-2018-0125406, filed on Oct. 19, 2018, Korean Patent Application No. 10-2019-0053248, filed on May 7, 2019, and Korean Patent Application No. 10-2019-0062583, filed on May 28, 2019, the disclosures of which are incorporated by reference herein in their entireties.

BACKGROUND

1. Field

The disclosure relates to an image processing field. More particularly, the disclosure relates to methods and apparatuses for encoding and decoding an image based on artificial intelligence (AI).

2. Description of Related Art

An image is stored in a recording medium or transmitted via a communication channel in a form of a bitstream after being encoded via a codec following a certain data compression standard, such as the Moving Picture Expert Group (MPEG) standard.

With the development and supply of hardware capable of reproducing and storing a high resolution and high quality image, the need for a codec capable of effectively encoding and decoding the high resolution and high quality image has increased.

SUMMARY

Provided are methods and apparatuses for performing artificial intelligence (AI) encoding and AI decoding on an image, wherein an image is encoded and decoded based on AI to achieve a low bitrate.

Additional aspects will be set forth in part in the description which follows and, in part, will be apparent from the description, or may be learned by practice of the presented embodiments.

According to an aspect of the present disclosure, an artificial intelligence (AI) decoding apparatus includes: a memory storing one or more instructions; and a processor configured to execute the one or more instructions stored in the memory, wherein the processor is configured to: obtain AI data related to AI down-scaling an original image to a first image, the AI data comprising at least one of information related to the first image and information about a difference between the original image and the first image; obtain image data corresponding to an encoding result on the first image; obtain a second image corresponding to the first image by performing a decoding on the image data; obtain deep neural network (DNN) setting information among a plurality of DNN setting information from the AI data, the DNN setting information being for performing AI up-scaling on the second image; and obtain, by an up-scaling DNN, a third image by performing the AI up-scaling on the second image, the up-scaling DNN being configured with the obtained DNN setting information, wherein the plurality of DNN setting information comprises a parameter used in the up-scaling DNN, the parameter being obtained through joint training of the up-scaling DNN and a down-scaling DNN, and wherein the down-scaling DNN is used to obtain the first image from the original image.

The AI data may include the information about the difference between the original image and the first image, and the processor may be further configured to obtain the DNN setting information for performing AI up-scaling on the second image to match the third image with the difference between the original image and the first image.

The AI data may include the information related to the first image, and the processor may be further configured to obtain the DNN setting information mapped to the information related to the first image, based on a mapping relationship between several image-related information and the plurality of DNN setting information, wherein the information related to the first image comprises at least one of a resolution, a bitrate or a codec type.

The image data may include quantization parameter information used in the decoding, and the processor may be further configured to obtain, based on the quantization parameter information and the information related to the first image, the DNN setting information.

The obtained DNN setting information may include parameters of a filter kernel, the filter kernel may be associated with at least one convolution layer, and the up-scaling DNN may include the at least one convolution layer.

The processor may be further configured to set the up-scaling DNN with the obtained DNN setting information instead of DNN setting information set in the up-scaling DNN, when the DNN setting information set in the up-scaling DNN is different from the obtained DNN setting information.

The up-scaling DNN may be trained based on quality loss information, wherein the quality loss information may be correspond to a comparison of a training image output from the up-scaling DNN and an original training image before AI down-scaling is performed.

The quality loss information may be used in training of the down-scaling DNN.

When parameters of a DNN of any one of the up-scaling DNN and the down-scaling DNN are updated during a training process, parameters of a DNN of the other one may be updated.

According to another aspect of the present disclosure, a system includes: an AI encoding apparatus including a down-scaling DNN, the down-scaling DNN being configured to be trained based on: structural loss information corresponding to a comparison of a first training image output from the down-scaling DNN and a reduced training image, complexity loss information corresponding to a spatial complexity of the first training image, and quality loss information corresponding to a comparison of the original training image and a third training image output from the up-scaling DNN; and an AI decoding apparatus including the up-scaling DNN, the up-scaling DNN being configured to be trained based on the quality loss information.

According to another aspect of the present disclosure, an artificial intelligence (AI) encoding apparatus includes: a memory storing one or more instructions; and a processor configured to execute the one or more instructions stored in the memory to: obtain, by a down-scaling deep neural network (DNN) performing AI down-scaling on an original image, a first image, the down-scaling DNN being configured with DNN setting information; encode the first image to obtain image data; and transmit the image data and AI data for selecting DNN setting information of an up-scaling DNN, the AI data comprising at least one of information related to the first image and information about a difference between the original image and the first image, wherein the up-scaling DNN is configured to perform AI up-scaling on a second image, wherein the second image is obtained by decoding the image data, and wherein the DNN setting information of the down-scaling DNN and the DNN setting information of the up-scaling DNN comprises a parameter used in the down-scaling DNN and the up-scaling DNN, the parameter being obtained through joint training of the up-scaling DNN and a down-scaling DNN.

The down-scaling DNN and the up-scaling DNN may be trained based on quality loss information, wherein the quality loss information may be correspond to a comparison of a training image output from the up-scaling DNN and an original training image before AI down-scaling is performed.

According to another aspect of the present disclosure, an artificial intelligence (AI) decoding method of an image, the AI decoding method includes: obtaining AI data related to AI down-scaling an original image to a first image, the AI data comprising at least one of information related to the first image and information about a difference between the original image and the first image; obtaining image data corresponding to an encoding result on the first image; obtaining a second image corresponding to the first image by performing a decoding on the image data; obtaining deep neural network (DNN) setting information among a plurality of DNN setting information from the AI data, the DNN setting information being for performing AI up-scaling on the second image; and obtaining, by an up-scaling DNN, a third image by performing the AI up-scaling on the second image, the up-scaling DNN being configured with the obtained DNN setting information, wherein the plurality of DNN setting information comprises a parameter used in the up-scaling DNN, the parameter being obtained through joint training of the up-scaling DNN and a down-scaling DNN, and wherein the down-scaling DNN is used to obtain the first image from the original image.

According to another aspect of the present disclosure, an artificial intelligence (AI) encoding method of an image, the AI encoding method includes: obtaining, by a down-scaling deep neural network (DNN) performing AI down-scaling on an original image, a first image, the down-scaling DNN being configured with DNN setting information; encoding the first image to obtain image data; and transmitting the image data and AI data for selecting DNN setting information of an up-scaling DNN, the AI data comprising at least one of information related to the first image and information about a difference between the original image and the first image, wherein the up-scaling DNN is configured to perform AI up-scaling on a second image, wherein the second image is obtained by decoding the image data, and wherein the DNN setting information of the down-scaling DNN and the DNN setting information of the up-scaling DNN comprises a parameter used in the down-scaling DNN and the up-scaling DNN, the parameter being obtained through joint training of the up-scaling DNN and a down-scaling DNN.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5 is a table showing a mapping relationship between several pieces of image-related information and several pieces of DNN setting information.

DETAILED DESCRIPTION

Figure 1:
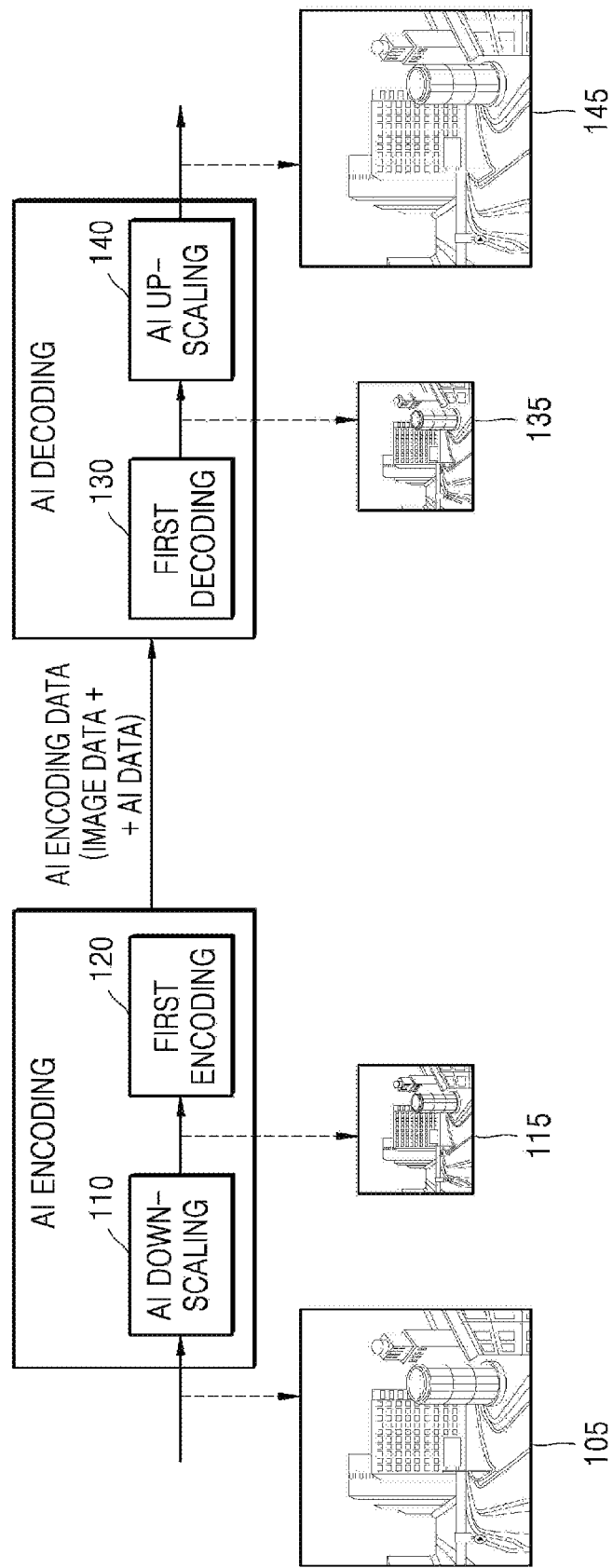
FIG. 1 is a diagram for describing an artificial intelligence (AI) encoding process and an AI decoding process, according to an embodiment.

As the disclosure allows for various changes and numerous examples, particular embodiments will be illustrated in the drawings and described in detail in the written description. However, this is not intended to limit the disclosure to particular modes of practice, and it will be understood that all changes, equivalents, and substitutes that do not depart from the spirit and technical scope of the disclosure are encompassed in the disclosure.

In the description of embodiments, certain detailed explanations of related art are omitted when it is deemed that they may unnecessarily obscure the essence of the disclosure. Also, numbers (for example, a first, a second, and the like) used in the description of the specification are merely identifier codes for distinguishing one element from another.

Also, in the present specification, it will be understood that when elements are "connected" or "coupled" to each other, the elements may be directly connected or coupled to each other, but may alternatively be connected or coupled to each other with an intervening element therebetween, unless specified otherwise.

In the present specification, regarding an element represented as a "unit" or a "module", two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another component.

Also, in the present specification, an 'image' or a 'picture' may denote a still image, a moving image including a plurality of consecutive still images (or frames), or a video.

Also, in the present specification, a deep neural network (DNN) is a representative example of an artificial neural network model simulating brain nerves, and is not limited to an artificial neural network model using a specific algorithm.

Also, in the present specification, a 'parameter' is a value used in an operation process of each layer forming a neural network, and for example, may include a weight used when an input value is applied to a certain operation expression. Here, the parameter may be expressed in a matrix form. The parameter is a value set as a result of training, and may be updated through separate training data when necessary.

Also, in the present specification, a 'first DNN' indicates a DNN used for artificial intelligence (AI) down-scaling an image, and a 'second DNN' indicates a DNN used for AI up-scaling an image.

Also, in the present specification, 'DNN setting information' includes information related to an element constituting a DNN. 'DNN setting information' includes the parameter described above as information related to the element constituting the DNN. The first DNN or the second DNN may be set by using the DNN setting information.

Also, in the present specification, an 'original image' denotes an image to be an object of AI encoding, and a 'first image' denotes an image obtained as a result of performing AI down-scaling on the original image during an AI encoding process. Also, a 'second image' denotes an image obtained via first decoding during an AI decoding process, and a 'third image' denotes an image obtained by AI up-scaling the second image during the AI decoding process.

Also, in the present specification, 'AI down-scale' denotes a process of decreasing resolution of an image based on AI, and 'first encoding' denotes an encoding process according to an image compression method based on frequency transformation. Also, 'first decoding' denotes a decoding process according to an image reconstruction method based on frequency transformation, and 'AI up-scale' denotes a process of increasing resolution of an image based on AI.

FIG. 1 is a diagram for describing an AI encoding process and an AI decoding process, according to an embodiment.

As described above, when resolution of an image remarkably increases, the throughput of information for encoding and decoding the image is increased, and accordingly, a method for improving efficiency of encoding and decoding of an image is required.

As shown in FIG. 1, according to an embodiment of the disclosure, a first image 115 is obtained by performing AI down-scaling 110 on an original image 105 having high resolution. Then, first encoding 120 and first decoding 130 are performed on the first image 115 having relatively low resolution, and thus a bitrate may be largely reduced compared to when the first encoding and the first decoding are performed on the original image 105.

In particular, in FIG. 1, the first image 115 is obtained by performing the AI down-scaling 110 on the original image 105 and the first encoding 120 is performed on the first image 115 during the AI encoding process, according to an embodiment. During the AI decoding process, AI encoding data including AI data and image data, which are obtained as a result of AI encoding is received, a second image 135 is obtained via the first decoding 130, and a third image 145 is obtained by performing AI up-scaling 140 on the second image 135.

Referring to the AI encoding process in detail, when the original image 105 is received, the AI down-scaling 110 is performed on the original image 105 to obtain the first image 115 of certain resolution or certain quality. Here, the AI down-scaling 110 is performed based on AI, and AI for the AI down-scaling 110 needs to be trained jointly with AI for the AI up-scaling 140 of the second image 135. This is because, when the AI for the AI down-scaling 110 and the AI for the AI up-scaling 140 are separately trained, a difference between the original image 105 which is an object of AI encoding and the third image 145 reconstructed through AI decoding is increased.

In an embodiment of the disclosure, the AI data may be used to maintain such a joint relationship during the AI encoding process and the AI decoding process. Accordingly, the AI data obtained through the AI encoding process may include information indicating an up-scaling target, and during the AI decoding process, the AI up-scaling 140 is performed on the second image 135 according to the up-scaling target verified based on the AI data.

The AI for the AI down-scaling 110 and the AI for the AI up-scaling 140 may be embodied as a DNN. As will be described later with reference to FIG. 9, because a first DNN and a second DNN are jointly trained by sharing loss information under a certain target, an AI encoding apparatus may provide target information used during joint training of the first DNN and the second DNN to an AI decoding apparatus, and the AI decoding apparatus may perform the AI up-scaling 140 on the second image 135 to target resolution based on the provided target information.

Regarding the first encoding 120 and the first decoding 130 of FIG. 1, information amount of the first image 115 obtained by performing AI down-scaling 110 on the original image 105 may be reduced through the first encoding 120. The first encoding 120 may include a process of generating prediction data by predicting the first image 115, a process of generating residual data corresponding to a difference between the first image 115 and the prediction data, a process of transforming the residual data of a spatial domain component to a frequency domain component, a process of quantizing the residual data transformed to the frequency domain component, and a process of entropy-encoding the quantized residual data. Such first encoding 120 may be performed via one of image compression methods using frequency transformation, such as MPEG-2, H.264 Advanced Video Coding (AVC), MPEG-4, High Efficiency Video Coding (HEVC), VC-1, VP8, VP9, and AOMedia Video 1 (AV1).

The second image 135 corresponding to the first image 115 may be reconstructed by performing the first decoding 130 on the image data. The first decoding 130 may include a process of generating the quantized residual data by entropy-decoding the image data, a process of inverse-quantizing the quantized residual data, a process of transforming the residual data of the frequency domain component to the spatial domain component, a process of generating the prediction data, and a process of reconstructing the second image 135 by using the prediction data and the residual data. Such first decoding 130 may be performed via an image reconstruction method corresponding to one of image compression methods using frequency transformation, such as MPEG-2, H.264 AVC, MPEG-4, HEVC, VC-1, VP8, VP9, and AV1, which is used in the first encoding 120.

The AI encoding data obtained through the AI encoding process may include the image data obtained as a result of performing the first encoding 120 on the first image 115, and the AI data related to the AI down-scaling 110 of the original image 105. The image data may be used during the first decoding 130 and the AI data may be used during the AI up-scaling 140.

The image data may be transmitted in a form of a bitstream. The image data may include data obtained based on pixel values in the first image 115, for example, residual data that is a difference between the first image 115 and prediction data of the first image 115. Also, the image data includes information used during the first encoding 120 performed on the first image 115. For example, the image data may include prediction mode information, motion information, and information related to quantization parameter used during the first encoding 120. The image data may be generated according to a rule, for example, according to a syntax, of an image compression method used during the first encoding 120, among MPEG-2, H.264 AVC, MPEG-4, HEVC, VC-1, VP8, VP9, and AV1.

The AI data is used in the AI up-scaling 140 based on the second DNN. As described above, because the first DNN and the second DNN are jointly trained, the AI data includes information enabling the AI up-scaling 140 to be performed accurately on the second image 135 through the second DNN. During the AI decoding process, the AI up-scaling 140 may be performed on the second image 135 to have targeted resolution and/or quality, based on the AI data.

The AI data may be transmitted together with the image data in a form of a bitstream. Alternatively, according to an embodiment, the AI data may be transmitted separately from the image data, in a form of a frame or a packet. The AI data and the image data obtained as a result of the AI encoding may be transmitted through the same network or through different networks.

Figure 2:
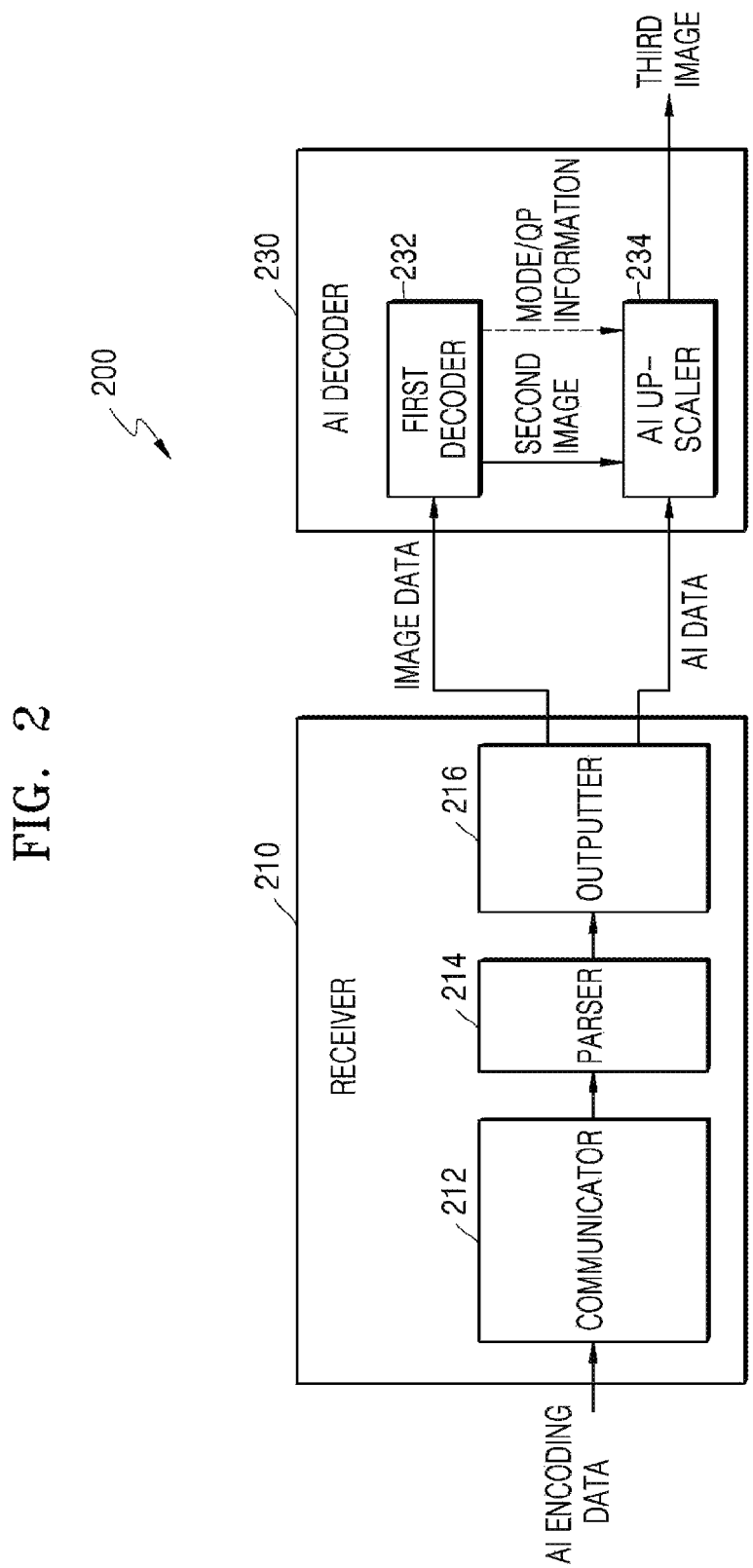
FIG. 2 is a block diagram of a configuration of an AI decoding apparatus according to an embodiment.

FIG. 2 is a block diagram of a configuration of an AI decoding apparatus 100 according to an embodiment.

Referring to FIG. 2, the AI decoding apparatus 200 according to an embodiment may include a receiver 210 and an AI decoder 230. The receiver 210 may include a communicator 212, a parser 214, and an outputter 216. The AI decoder 230 may include a first decoder 232 and an AI up-scaler 234.

The receiver 210 receives and parses AI encoding data obtained as a result of AI encoding, and distinguishably outputs image data and AI data to the AI decoder 230.

In particular, the communicator 212 receives the AI encoding data obtained as the result of AI encoding through a network. The AI encoding data obtained as the result of performing AI encoding includes the image data and the AI data. The image data and the AI data may be received through a same type of network or different types of networks.

The parser 214 receives the AI encoding data received through the communicator 212 and parses the AI encoding data to distinguish the image data and the AI data. For example, the parser 214 may distinguish the image data and the AI data by reading a header of data obtained from the communicator 212. According to an embodiment, the parser 214 distinguishably transmits the image data and the AI data to the outputter 216 via the header of the data received through the communicator 212, and the outputter 216 transmits the distinguished image data and AI data respectively to the first decoder 232 and the AI up-scaler 234. At this time, it may be verified that the image data included in the AI encoding data is image data generated via a certain codec (for example, MPEG-2, H.264 AVC, MPEG-4, HEVC, VC-1, VP8, VP9, or AV1). In this case, corresponding information may be transmitted to the first decoder 232 through the outputter 216 such that the image data is processed via the verified codec.

According to an embodiment, the AI encoding data parsed by the parser 214 may be obtained from a data storage medium including a magnetic medium such as a hard disk, a floppy disk, or a magnetic tape, an optical recording medium such as CD-ROM or DVD, or a magneto-optical medium such as a floptical disk.

The first decoder 232 reconstructs the second image 135 corresponding to the first image 115, based on the image data. The second image 135 obtained by the first decoder 232 is provided to the AI up-scaler 234. According to an embodiment, first decoding related information, such as prediction mode information, motion information, quantization parameter information, or the like included in the image data may be further provided to the AI up-scaler 234.

Upon receiving the AI data, the AI up-scaler 234 performs AI up-scaling on the second image 135, based on the AI data. According to an embodiment, the AI up-scaling may be performed by further using the first decoding related information, such as the prediction mode information, the quantization parameter information, or the like included in the image data.

The receiver 210 and the AI decoder 230 according to an embodiment are described as individual devices, but may be implemented through one processor. In this case, the receiver 210 and the AI decoder 230 may be implemented through an dedicated processor or through a combination of software and general-purpose processor such as application processor (AP), central processing unit (CPU) or graphic processing unit (GPU). The dedicated processor may be implemented by including a memory for implementing an embodiment of the disclosure or by including a memory processor for using an external memory.

Also, the receiver 210 and the AI decoder 230 may be configured by a plurality of processors. In this case, the receiver 210 and the AI decoder 230 may be implemented through a combination of dedicated processors or through a combination of software and general-purpose processors such as AP, CPU or GPU. Similarly, the AI up-scaler 234 and the first decoder 232 may be implemented by different processors.

The AI data provided to the AI up-scaler 234 includes information enabling the second image 135 to be processed via AI up-scaling. Here, an up-scaling target should correspond to down-scaling of a first DNN. Accordingly, the AI data includes information for verifying a down-scaling target of the first DNN.

Examples of the information included in the AI data include difference information between resolution of the original image 105 and resolution of the first image 115, and information related to the first image 115.

The difference information may be expressed as information about a resolution conversion degree of the first image 115 compared to the original image 105 (for example, resolution conversion rate information). Also, because the resolution of the first image 115 is verified through the resolution of the reconstructed second image 135 and the resolution conversion degree is verified accordingly, the difference information may be expressed only as resolution information of the original image 105. Here, the resolution information may be expressed as vertical/horizontal sizes or as a ratio (16:9, 4:3, or the like) and a size of one axis. Also, when there is pre-set resolution information, the resolution information may be expressed in a form of an index or flag.

The information related to the first image 115 may include information about at least one of a bitrate of the image data obtained as the result of performing first encoding on the first image 115 or a codec type used during the first encoding of the first image 115.

The AI up-scaler 234 may determine the up-scaling target of the second image 135, based on at least one of the difference information or the information related to the first image 115, which are included in the AI data. The up-scaling target may indicate, for example, to what degree resolution is to be up-scaled for the second image 135. When the up-scaling target is determined, the AI up-scaler 234 performs AI up-scaling on the second image 135 through a second DNN to obtain the third image 145 corresponding to the up-scaling target.

Before describing a method, performed by the AI up-scaler 234, of performing AI up-scaling on the second image 135 according to the up-scaling target, an AI up-scaling process through the second DNN will be described with reference to FIGS. 3 and 4.

Figure 3:
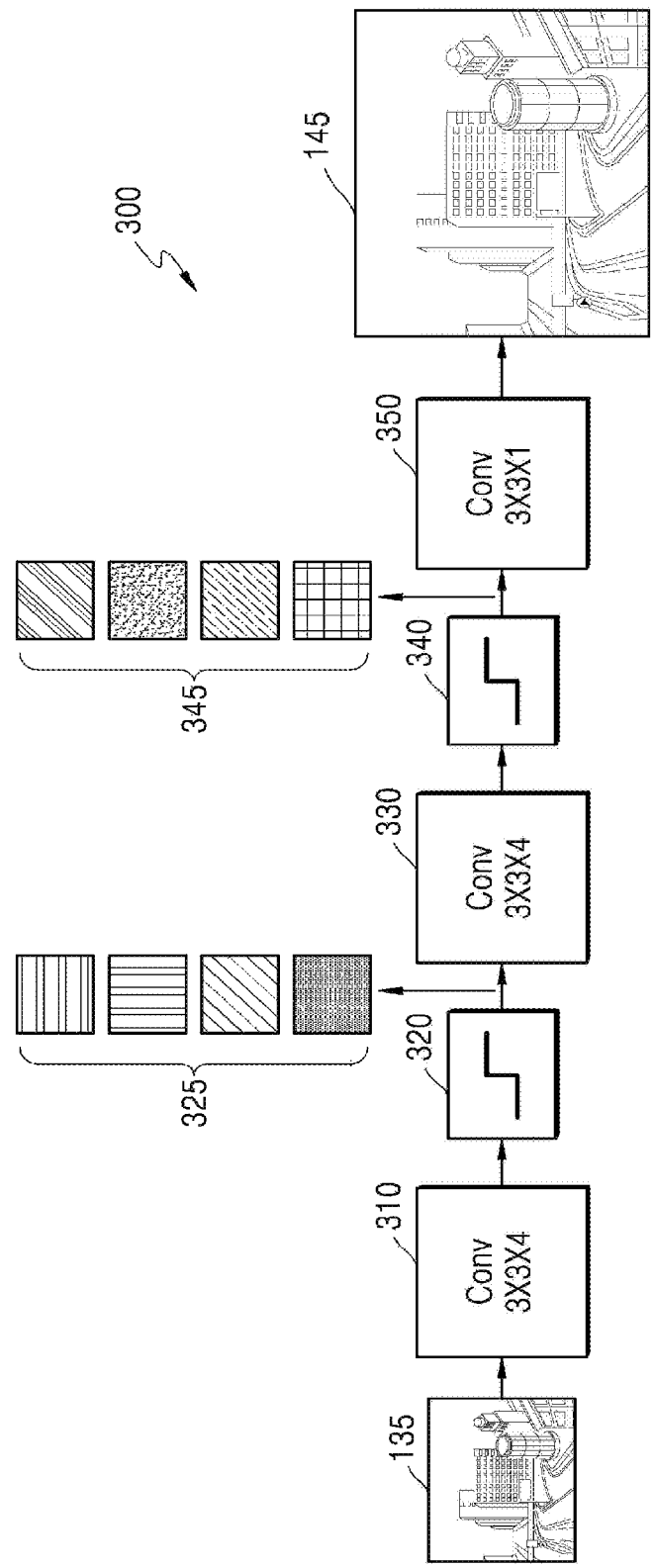
FIG. 3 is a diagram showing a second deep neural network (DNN) for performing AI up-scaling on a second image.
Figure 4:
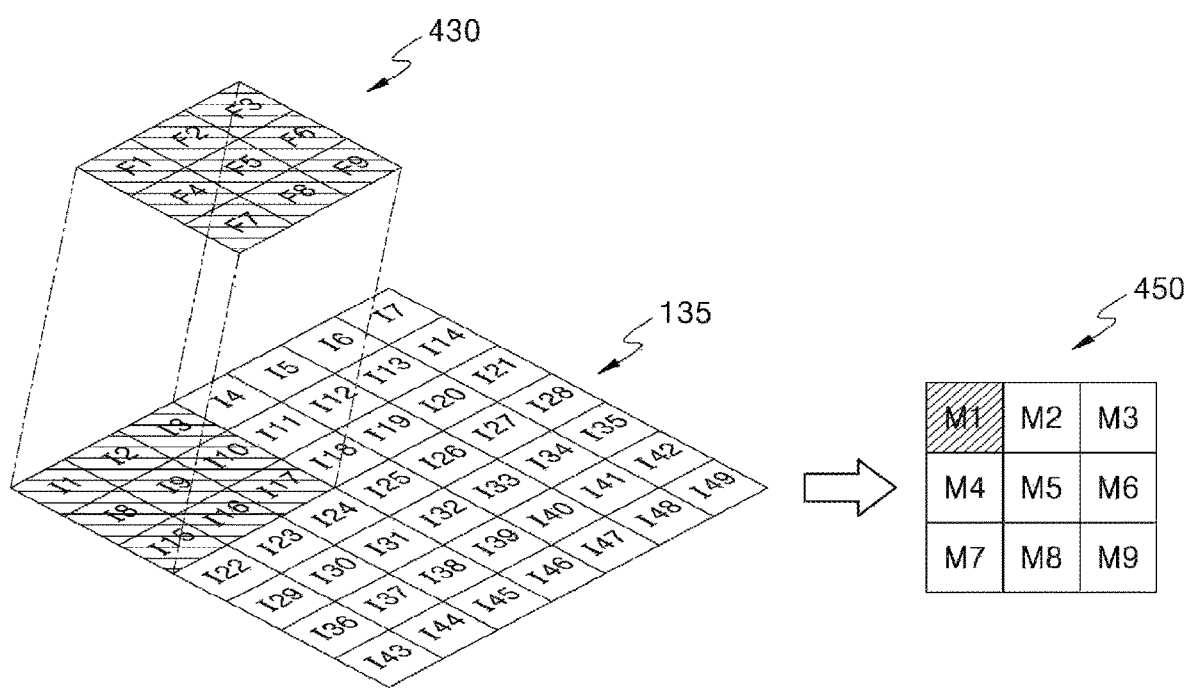
FIG. 4 is a diagram for describing a convolution operation by a convolution layer.

FIG. 3 is a diagram showing a second DNN 300 for performing AI up-scaling on the second image 135, and FIG. 4 is a diagram for describing a convolution operation in a first convolution layer 310 of FIG. 3.

As shown in FIG. 3, the second image 135 is input to the first convolution layer 310. 3×3×4 indicated in the first convolution layer 310 shown in FIG. 3 indicates that a convolution process is performed on one input image by using four filter kernels having a size of 3×3. Four feature maps are generated by the four filter kernels as a result of the convolution process. Each feature map indicates inherent characteristics of the second image 135. For example, each feature map may represent a vertical direction characteristic, a horizontal direction characteristic, or an edge characteristic, etc. of the second image 135.

A convolution operation in the first convolution layer 310 will be described in detail with reference to FIG. 4.

One feature map 450 may be generated through multiplication and addition between parameters of a filter kernel 430 having a size of 3×3 used in the first convolution layer 310 and corresponding pixel values in the second image 135. Because four filter kernels are used in the first convolution layer 310, four feature maps may be generated through the convolution operation using the four filter kernels.

I1 through I49 indicated in the second image 135 in FIG. 4 indicate pixels in the second image 135, and F1 through F9 indicated in the filter kernel 430 indicate parameters of the filter kernel 430. Also, M1 through M9 indicated in the feature map 450 indicate samples of the feature map 450.

In FIG. 4, the second image 135 includes 49 pixels, but the number of pixels is only an example and when the second image 135 has a resolution of 4 K, the second image 135 may include, for example, 3840×2160 pixels.

During a convolution operation process, pixel values of I1, I2, I3, I8, I9, I10, I15, I16, and I17 of the second image 135 and F1 through F9 of the filter kernels 430 are respectively multiplied, and a value of combination (for example, addition) of result values of the multiplication may be assigned as a value of M1 of the feature map 450. When a stride of the convolution operation is 2, pixel values of I3, I4, I5, I10, I11, I12, I17, I18, and I19 of the second image 135 and F1 through F9 of the filter kernels 430 are respectively multiplied, and the value of the combination of the result values of the multiplication may be assigned as a value of M2 of the feature map 450.

While the filter kernel 430 moves along the stride to the last pixel of the second image 135, the convolution operation is performed between the pixel values in the second image 135 and the parameters of the filter kernel 430, and thus the feature map 450 having a certain size may be generated.

According to the present disclosure, values of parameters of a second DNN, for example, values of parameters of a filter kernel used in convolution layers of the second DNN (for example, F1 through F9 of the filter kernel 430), may be optimized through joint training of a first DNN and the second DNN. As described above, the AI up-scaler 234 may determine an up-scaling target corresponding to a down-scaling target of the first DNN based on AI data, and determine parameters corresponding to the determined up-scaling target as the parameters of the filter kernel used in the convolution layers of the second DNN.

Convolution layers included in the first DNN and the second DNN may perform processes according to the convolution operation process described with reference to FIG. 4, but the convolution operation process described with reference to FIG. 4 is only an example and is not limited thereto.

Referring back to FIG. 3, the feature maps output from the first convolution layer 310 may be input to a first activation layer 320.

The first activation layer 320 may assign a non-linear feature to each feature map. The first activation layer 320 may include a sigmoid function, a Tanh function, a rectified linear unit (ReLU) function, or the like, but is not limited thereto.

The first activation layer 320 assigning the non-linear feature indicates that at least one sample value of the feature map, which is an output of the first convolution layer 310, is changed. Here, the change is performed by applying the non-linear feature.

The first activation layer 320 determines whether to transmit sample values of the feature maps output from the first convolution layer 310 to the second convolution layer 330. For example, some of the sample values of the feature maps are activated by the first activation layer 320 and transmitted to the second convolution layer 330, and some of the sample values are deactivated by the first activation layer 320 and not transmitted to the second convolution layer 330. The intrinsic characteristics of the second image 135 represented by the feature maps are emphasized by the first activation layer 320.

Feature maps 325 output from the first activation layer 320 are input to the second convolution layer 330. One of the feature maps 325 shown in FIG. 3 is a result of processing the feature map 450 described with reference to FIG. 4 in the first activation layer 320.

3×3×4 indicated in the second convolution layer 330 indicates that a convolution process is performed on the feature maps 325 by using four filter kernels having a size of 3×3. An output of the second convolution layer 330 is input to a second activation layer 340. The second activation layer 340 may assign a non-linear feature to input data.

Feature maps 345 output from the second activation layer 340 are input to a third convolution layer 350. 3×3×1 indicated in the third convolution layer 350 shown in FIG. 3 indicates that a convolution process is performed to generate one output image by using one filter kernel having a size of 3×3. The third convolution layer 350 is a layer for outputting a final image and generates one output by using one filter kernel. According to an embodiment of the disclosure, the third convolution layer 350 may output the third image 145 as a result of a convolution operation.

There may be a plurality of pieces of DNN setting information indicating the numbers of filter kernels of the first, second, and third convolution layers 310, 330, and 350 of the second DNN 300, a parameter of filter kernels of the first, second, and third convolution layers 310, 330, and 350 of the second DNN 300, and the like, as will be described later, and the plurality of pieces of DNN setting information should be connected to a plurality of pieces of DNN setting information of a first DNN. The connection between the plurality of pieces of DNN setting information of the second DNN and the plurality of pieces of DNN setting information of the first DNN may be realized via joint training of the first DNN and the second DNN.

In FIG. 3, the second DNN 300 includes three convolution layers (the first, second, and third convolution layers 310, 330, and 350) and two activation layers (the first and second activation layers 320 and 340), but this is only an example, and the numbers of convolution layers and activation layers may vary according to an embodiment. Also, according to an embodiment, the second DNN 300 may be implemented as a recurrent neural network (RNN). In this case, a convolutional neural network (CNN) structure of the second DNN 300 according to an embodiment of the disclosure is changed to an RNN structure.

According to an embodiment, the AI up-scaler 234 may include at least one arithmetic logic unit (ALU) for the convolution operation and the operation of the activation layer described above. The ALU may be implemented as a processor. For the convolution operation, the ALU may include a multiplier that performs multiplication between sample values of the second image 135 or the feature map output from previous layer and sample values of the filter kernel, and an adder that adds result values of the multiplication. Also, for the operation of the activation layer, the ALU may include a multiplier that multiplies an input sample value by a weight used in a pre-determined sigmoid function, a Tanh function, or an ReLU function, and a comparator that compares a multiplication result and a certain value to determine whether to transmit the input sample value to a next layer.

Hereinafter, a method, performed by the AI up-scaler 234, of performing the AI up-scaling on the second image 135 according to the up-scaling target will be described.

According to an embodiment, the AI up-scaler 234 may store a plurality of pieces of DNN setting information settable in a second DNN.

Here, the DNN setting information may include information about at least one of the number of convolution layers included in the second DNN, the number of filter kernels for each convolution layer, or a parameter of each filter kernel. The plurality of pieces of DNN setting information may respectively correspond to various up-scaling targets, and the second DNN may operate based on DNN setting information corresponding to a certain up-scaling target. The second DNN may have different structures based on the DNN setting information. For example, the second DNN may include three convolution layers based on any piece of DNN setting information, and may include four convolution layers based on another piece of DNN setting information.

According to an embodiment, the DNN setting information may only include a parameter of a filter kernel used in the second DNN. In this case, the structure of the second DNN does not change, but only the parameter of the internal filter kernel may change based on the DNN setting information.

The AI up-scaler 234 may obtain the DNN setting information for performing AI up-scaling on the second image 135, among the plurality of pieces of DNN setting information. Each of the plurality of pieces of DNN setting information used at this time is information for obtaining the third image 145 of pre-determined resolution and/or pre-determined quality, and is trained jointly with a first DNN.

For example, one piece of DNN setting information among the plurality of pieces of DNN setting information may include information for obtaining the third image 145 of resolution twice higher than resolution of the second image 135, for example, the third image 145 of 4 K (4096×2160) twice higher than 2 K (2048×1080) of the second image 135, and another piece of DNN setting information may include information for obtaining the third image 145 of resolution four times higher than the resolution of the second image 135, for example, the third image 145 of 8 K (8192×4320) four times higher than 2 K (2048×1080) of the second image 135.

Figure 6:
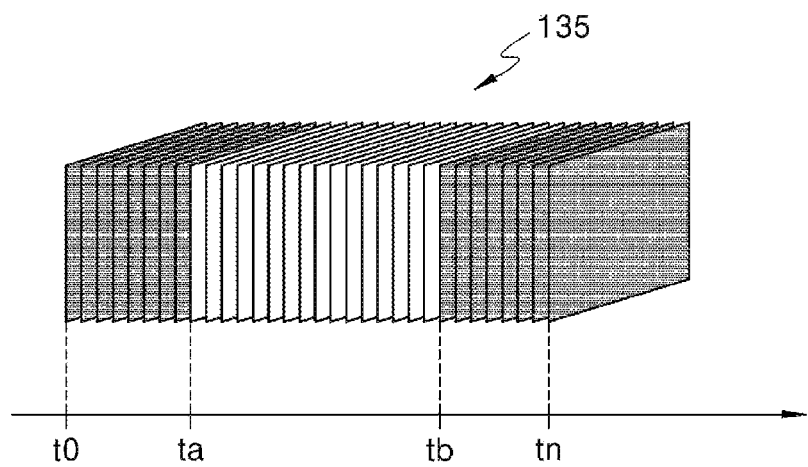
FIG. 6 is a diagram showing a second image including a plurality of frames.

Each of the plurality of pieces of DNN setting information is obtained jointly with DNN setting information of the first DNN of an AI encoding apparatus 600 of FIG. 6, and the AI up-scaler 234 obtains one piece of DNN setting information among the plurality of pieces of DNN setting information according to an enlargement ratio corresponding to a reduction ratio of the DNN setting information of the first DNN. In this regard, the AI up-scaler 234 may verify information of the first DNN. In order for the AI up-scaler 234 to verify the information of the first DNN, the AI decoding apparatus 200 according to an embodiment receives AI data including the information of the first DNN from the AI encoding apparatus 600.

In other words, the AI up-scaler 234 may verify information targeted by DNN setting information of the first DNN used to obtain the first image 115 and obtain the DNN setting information of the second DNN trained jointly with the DNN setting information of the first DNN, by using information received from the AI encoding apparatus 600.

When DNN setting information for performing the AI up-scaling on the second image 135 is obtained from among the plurality of pieces of DNN setting information, input data may be processed based on the second DNN operating according to the obtained DNN setting information.

For example, when any one piece of DNN setting information is obtained, the number of filter kernels included in each of the first, second, and third convolution layers 310, 330, and 350 of the second DNN 300 of FIG. 3, and the parameters of the filter kernels are set to values included in the obtained DNN setting information.

In particular, parameters of a filter kernel of 3×3 used in any one convolution layer of the second DNN of FIG. 4 are set to {1, 1, 1, 1, 1, 1, 1, 1, 1}, and when DNN setting information is changed afterwards, the parameters are replaced by {2, 2, 2, 2, 2, 2, 2, 2, 2} that are parameters included in the changed DNN setting information.

The AI up-scaler 234 may obtain the DNN setting information for AI up-scaling from among the plurality of pieces of DNN setting information, based on information included in the AI data, and the AI data used to obtain the DNN setting information will now be described.

According to an embodiment, the AI up-scaler 234 may obtain the DNN setting information for AI up-scaling from among the plurality of pieces of DNN setting information, based on difference information included in the AI data. For example, when it is verified that the resolution (for example, 4 K (4096×2160)) of the original image 105 is twice higher than the resolution (for example, 2 K (2048×1080)) of the first image 115, based on the difference information, the AI up-scaler 234 may obtain the DNN setting information for increasing the resolution of the second image 135 two times.

According to another embodiment, the AI up-scaler 234 may obtain the DNN setting information for AI up-scaling the second image 135 from among the plurality of pieces of DNN setting information, based on information related to the first image 115 included in the AI data. The AI up-scaler 234 may pre-determine a mapping relationship between image-related information and DNN setting information, and obtain the DNN setting information mapped to the information related to the first image 115.

FIG. 5 is a table showing a mapping relationship between several pieces of image-related information and several pieces of DNN setting information.

Through an embodiment according to FIG. 5, it will be determined that AI encoding and AI decoding processes according to an embodiment of the disclosure do not only consider a change of resolution. As shown in FIG. 5, DNN setting information may be selected considering resolution, such as standard definition (SD), high definition (HD), or full HD, a bitrate, such as 10 Mbps, 15 Mbps, or 20 Mbps, and codec information, such as AV1, H.264, or HEVC, individually or collectively. For such consideration of the resolution, the bitrate and the codec information, training in consideration of each element should be jointly performed with encoding and decoding processes during an AI training process (see FIG. 9).

Accordingly, when a plurality of pieces of DNN setting information are provided based on image-related information including a codec type, resolution of an image, and the like, as shown in FIG. 5 according to training, the DNN setting information for AI up-scaling the second image 135 may be obtained based on the information related to the first image 115 received during the AI decoding process.

In other words, the AI up-scaler 234 is capable of using DNN setting information according to image-related information by matching the image-related information at the left of a table of FIG. 5 and the DNN setting information at the right of the table.

As shown in FIG. 5, when it is verified, from the information related to the first image 115, that the resolution of the first image 115 is SD, a bitrate of image data obtained as a result of performing first encoding on the first image 115 is 10 Mbps, and the first encoding is performed on the first image 115 via AV1 codec, the AI up-scaler 234 may use A DNN setting information among the plurality of pieces of DNN setting information.

Also, when it is verified, from the information related to the first image 115, that the resolution of the first image 115 is HD, the bitrate of the image data obtained as the result of performing the first encoding is 15 Mbps, and the first encoding is performed via H.264 codec, the AI up-scaler 234 may use B DNN setting information among the plurality of pieces of DNN setting information.

Also, when it is verified, from the information related to the first image 115, that the resolution of the first image 115 is full HD, the bitrate of the image data obtained as the result of performing the first encoding is 20 Mbps, and the first encoding is performed via HEVC codec, the AI up-scaler 234 may use C DNN setting information among the plurality of pieces of DNN setting information, and when it is verified that the resolution of the first image 115 is full HD, the bitrate of the image data obtained as the result of performing the first encoding is 15 Mbps, and the first encoding is performed via HEVC codec, the AI up-scaler 234 may use D DNN setting information among the plurality of pieces of DNN setting information. One of the C DNN setting information and the D DNN setting information is selected based on whether the bitrate of the image data obtained as the result of performing the first encoding on the first image 115 is 20 Mbps or 15 Mbps. The different bitrates of the image data, obtained when the first encoding is performed on the first image 115 of the same resolution via the same codec, indicates different qualities of reconstructed images. Accordingly, a first DNN and a second DNN may be jointly trained based on certain image quality, and accordingly, the AI up-scaler 234 may obtain DNN setting information according to a bitrate of image data indicating the quality of the second image 135.

According to another embodiment, the AI up-scaler 234 may obtain the DNN setting information for performing AI up-scaling on the second image 135 from among the plurality of pieces of DNN setting information considering both information (prediction mode information, motion information, quantization parameter information, and the like) provided from the first decoder 232 and the information related to the first image 115 included in the AI data. For example, the AI up-scaler 234 may receive quantization parameter information used during a first encoding process of the first image 115 from the first decoder 232, verify a bitrate of image data obtained as an encoding result of the first image 115 from AI data, and obtain DNN setting information corresponding to the quantization parameter information and the bitrate. Even when the bitrates are the same, the quality of reconstructed images may vary according to the complexity of an image. A bitrate is a value representing the entire first image 115 on which first encoding is performed, and the quality of each frame may vary even within the first image 115. Accordingly, DNN setting information more suitable for the second image 135 may be obtained when prediction mode information, motion information, and/or a quantization parameter obtainable for each frame from the first decoder 232 are/is considered together, compared to when only the AI data is used.

Also, according to an embodiment, the AI data may include an identifier of mutually agreed DNN setting information. An identifier of DNN setting information is information for distinguishing a pair of pieces of DNN setting information jointly trained between the first DNN and the second DNN, such that AI up-scaling is performed on the second image 135 to the up-scaling target corresponding to the down-scaling target of the first DNN. The AI up-scaler 234 may perform AI up-scaling on the second image 135 by using the DNN setting information corresponding to the identifier of the DNN setting information, after obtaining the identifier of the DNN setting information included in the AI data. For example, identifiers indicating each of the plurality of DNN setting information settable in the first DNN and identifiers indicating each of the plurality of DNN setting information settable in the second DNN may be previously designated. In this case, the same identifier may be designated for a pair of DNN setting information settable in each of the first DNN and the second DNN. The AI data may include an identifier of DNN setting information set in the first DNN for AI down-scaling of the original image 105. The AI up-scaler 234 that receives the AI data may perform AI up-scaling on the second image 135 by using the DNN setting information indicated by the identifier included in the AI data among the plurality of DNN setting information.

Also, according to an embodiment, the AI data may include the DNN setting information. The AI up-scaler 234 may perform AI up-scaling on the second image 135 by using the DNN setting information after obtaining the DNN setting information included in the AI data.

According to an embodiment, when pieces of information (for example, the number of convolution layers, the number of filter kernels for each convolution layer, a parameter of each filter kernel, and the like) constituting the DNN setting information are stored in a form of a lookup table, the AI up-scaler 234 may obtain the DNN setting information by combining some values selected from values in the lookup table, based on information included in the AI data, and perform AI up-scaling on the second image 135 by using the obtained DNN setting information.

According to an embodiment, when a structure of DNN corresponding to the up-scaling target is determined, the AI up-scaler 234 may obtain the DNN setting information, for example, parameters of a filter kernel, corresponding to the determined structure of DNN.

The AI up-scaler 234 obtains the DNN setting information of the second DNN through the AI data including information related to the first DNN, and performs AI up-scaling on the second image 135 through the second DNN set based on the obtained DNN setting information, and in this case, memory usage and throughput may be reduced compared to when features of the second image 135 are directly analyzed for up-scaling.

According to an embodiment, when the second image 135 includes a plurality of frames, the AI up-scaler 234 may independently obtain DNN setting information for a certain number of frames, or may obtain common DNN setting information for entire frames.

FIG. 6 is a diagram showing the second image 135 including a plurality of frames.

As shown in FIG. 6, the second image 135 may include frames t0 through tn.

According to an embodiment, the AI up-scaler 234 may obtain DNN setting information of a second DNN through AI data, and perform AI up-scaling on the frames t0 through tn based on the obtained DNN setting information. In other words, the frames t0 through tn may be processed via AI up-scaling based on common DNN setting information.

According to another embodiment, the AI up-scaler 234 may perform AI up-scaling on some of the frames t0 through tn, for example, the frames t0 through ta, by using 'A' DNN setting information obtained from AI data, and perform AI up-scaling on the frames ta+1 through tb by using 'B' DNN setting information obtained from the AI data. Also, the AI up-scaler 234 may perform AI up-scaling on the frames tb+1 through tn by using 'C' DNN setting information obtained from the AI data. In other words, the AI up-scaler 234 may independently obtain DNN setting information for each group including a certain number of frames among the plurality of frames, and perform AI up-scaling on frames included in each group by using the independently obtained DNN setting information.

According to another embodiment, the AI up-scaler 234 may independently obtain DNN setting information for each frame forming the second image 135. In other words, when the second image 135 includes three frames, the AI up-scaler 234 may perform AI up-scaling on a first frame by using DNN setting information obtained in relation to the first frame, perform AI up-scaling on a second frame by using DNN setting information obtained in relation to the second frame, and perform AI up-scaling on a third frame by using DNN setting information obtained in relation to the third frame. DNN setting information may be independently obtained for each frame included in the second image 135, according to a method of obtaining DNN setting information based on information (prediction mode information, motion information, quantization parameter information, or the like) provided from the first decoder 232 and information related to the first image 115 included in the AI data described above. This is because the mode information, the quantization parameter information, or the like may be determined independently for each frame included in the second image 135.

According to another embodiment, the AI data may include information about to which frame DNN setting information obtained based on the AI data is valid. For example, when the AI data includes information indicating that DNN setting information is valid up to the frame ta, the AI up-scaler 234 performs AI up-scaling on the frames t0 through ta by using DNN setting information obtained based on the AI data. Also, when another piece of AI data includes information indicating that DNN setting information is valid up to the frame tn, the AI up-scaler 234 performs AI up-scaling on the frames ta+1 through tn by using DNN setting information obtained based on the other piece of AI data.

Hereinafter, the AI encoding apparatus 600 for performing AI encoding on the original image 105 will be described with reference to FIG. 7.

Figure 7:
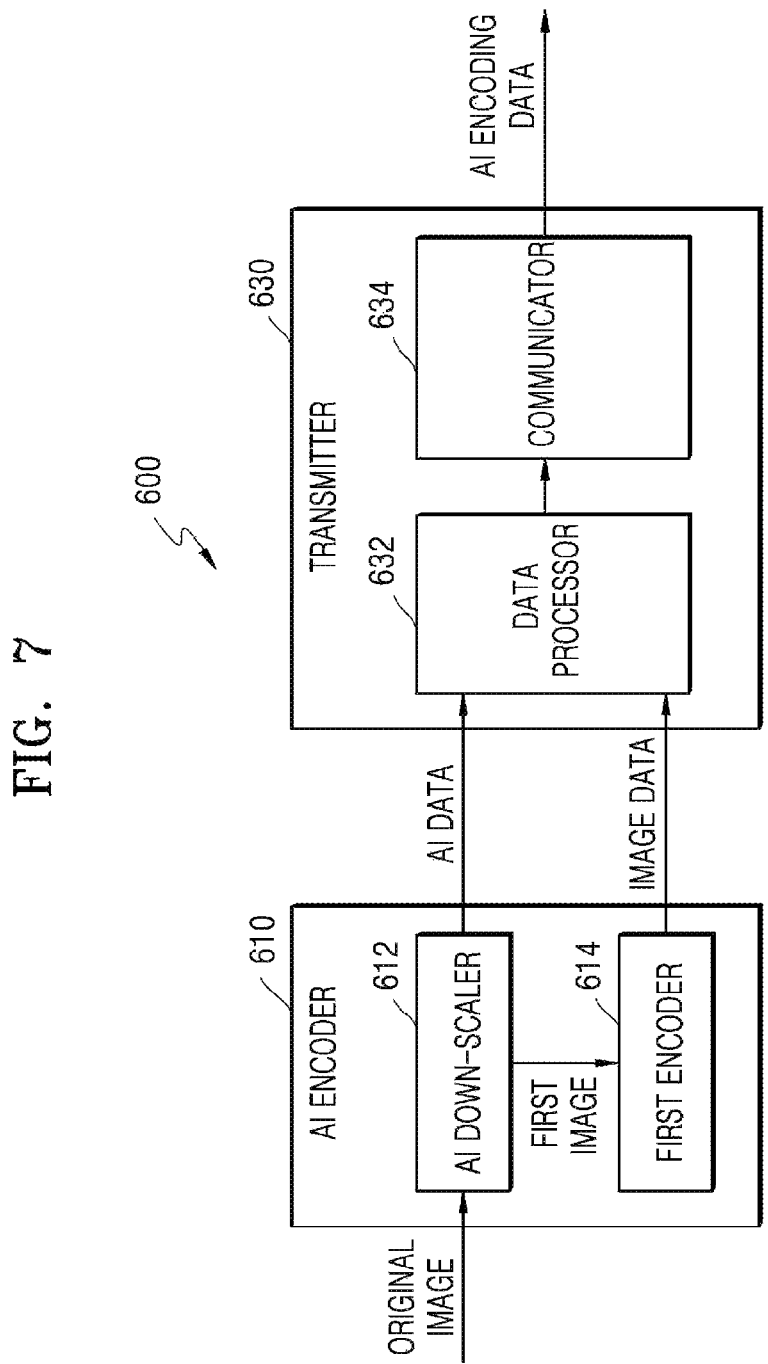
FIG. 7 is a block diagram of a configuration of an AI encoding apparatus according to an embodiment.

FIG. 7 is a block diagram of a configuration of the AI encoding apparatus 600 according to an embodiment.

Referring to FIG. 7, the AI encoding apparatus 600 may include an AI encoder 610 and a transmitter 630. The AI encoder 610 may include an AI down-scaler 612 and a first encoder 614. The transmitter 630 may include a data processor 632 and a communicator 634.

In FIG. 7, the AI encoder 610 and the transmitter 630 are illustrated as separate devices, but the AI encoder 610 and the transmitter 630 may be implemented through one processor. In this case, the AI encoder 610 and the transmitter 630 may be implemented through an dedicated processor or through a combination of software and general-purpose processor such as AR CPU or graphics processing unit GPU. The dedicated processor may be implemented by including a memory for implementing an embodiment of the disclosure or by including a memory processor for using an external memory.

Also, the AI encoder 610 and the transmitter 630 may be configured by a plurality of processors. In this case, the AI encoder 610 and the transmitter 630 may be implemented through a combination of dedicated processors or through a combination of software and a plurality of general-purpose processors such as AR CPU or GPU. The AI down-scaler 612 and the first encoder 614 may be implemented through different processors.

The AI encoder 610 performs AI down-scaling on the original image 105 and first encoding on the first image 115, and transmits AI data and image data to the transmitter 630. The transmitter 630 transmits the AI data and the image data to the AI decoding apparatus 200.

The image data includes data obtained as a result of performing the first encoding on the first image 115. The image data may include data obtained based on pixel values in the first image 115, for example, residual data that is a difference between the first image 115 and prediction data of the first image 115. Also, the image data includes information used during a first encoding process of the first image 115. For example, the image data may include prediction mode information, motion information, quantization parameter information used to perform the first encoding on the first image 115, and the like.

The AI data includes information enabling AI up-scaling to be performed on the second image 135 to an up-scaling target corresponding to a down-scaling target of a first DNN.

According to an embodiment, the AI data may include difference information between the original image 105 and the first image 115. Also, the AI data may include information related to the first image 115. The information related to the first image 115 may include information about at least one of resolution of the first image 115, a bitrate of the image data obtained as the result of performing the first encoding on the first image 115, or a codec type used during the first encoding of the first image 115.

According to an embodiment, the AI data may include an identifier of mutually agreed DNN setting information such that the AI up-scaling is performed on the second image 135 to the up-scaling target corresponding to the down-scaling target of the first DNN.

Also, according to an embodiment, the AI data may include DNN setting information settable in a second DNN.

The AI down-scaler 612 may obtain the first image 115 obtained by performing the AI down-scaling on the original image 105 through the first DNN. The AI down-scaler 612 may determine the down-scaling target of the original image 105, based on a pre-determined standard.

In order to obtain the first image 115 matching the down-scaling target, the AI down-scaler 612 may store a plurality of pieces of DNN setting information settable in the first DNN. The AI down-scaler 612 obtains DNN setting information corresponding to the down-scaling target from among the plurality of pieces of DNN setting information, and performs the AI down-scaling on the original image 105 through the first DNN set in the obtained DNN setting information.

Each of the plurality of pieces of DNN setting information may be trained to obtain the first image 115 of pre-determined resolution and/or pre-determined quality. For example, any one piece of DNN setting information among the plurality of pieces of DNN setting information may include information for obtaining the first image 115 of resolution half resolution of the original image 105, for example, the first image 115 of 2 K (2048×1080) half 4 K (4096×2160) of the original image 105, and another piece of DNN setting information may include information for obtaining the first image 115 of resolution quarter resolution of the original image 105, for example, the first image 115 of 2 K (2048×1080) quarter 8 K (8192×4320) of the original image 105.

According to an embodiment, when pieces of information (for example, the number of convolution layers, the number of filter kernels for each convolution layer, a parameter of each filter kernel, and the like) constituting the DNN setting information are stored in a form of a lookup table, the AI down-scaler 612 may obtain the DNN setting information by combining some values selected from values in the lookup table, based on the down-scaling target, and perform AI down-scaling on the original image 105 by using the obtained DNN setting information.

According to an embodiment, the AI down-scaler 612 may determine a structure of DNN corresponding to the down-scaling target, and obtain DNN setting information corresponding to the determined structure of DNN, for example, obtain parameters of a filter kernel.

The plurality of pieces of DNN setting information for performing the AI down-scaling on the original image 105 may have an optimized value as the first DNN and the second DNN are jointly trained. Here, each piece of DNN setting information includes at least one of the number of convolution layers included in the first DNN, the number of filter kernels for each convolution layer, or a parameter of each filter kernel.

The AI down-scaler 612 may set the first DNN with the DNN setting information obtained for performing the AI down-scaling on the original image 105 to obtain the first image 115 of certain resolution and/or certain quality through the first DNN. When the DNN setting information for performing the AI down-scaling on the original image 105 is obtained from the plurality of pieces of DNN setting information, each layer in the first DNN may process input data based on information included in the DNN setting information.

Hereinafter, a method, performed by the AI down-scaler 612, of determining the down-scaling target will be described. The down-scaling target may indicate, for example, by how much is resolution decreased from the original image 105 to obtain the first image 115.

According to an embodiment, the AI down-scaler 612 may determine the down-scaling target based on at least one of a compression ratio (for example, a resolution difference between the original image 105 and the first image 115, target bitrate, or the like), compression quality (for example, type of bitrate), compression history information, or a type of the original image 105.

For example, the AI down-scaler 612 may determine the down-scaling target based on the compression ratio, the compression quality, or the like, which is pre-set or input from a user.

As another example, the AI down-scaler 612 may determine the down-scaling target by using the compression history information stored in the AI encoding apparatus 600. For example, according to the compression history information usable by the AI encoding apparatus 600, encoding quality, a compression ratio, or the like preferred by the user may be determined, and the down-scaling target may be determined according to the encoding quality determined based on the compression history information. For example, the resolution, quality, or the like of the first image 115 may be determined according to the encoding quality that has been used most often according to the compression history information.

As another example, the AI down-scaler 612 may determine the down-scaling target based on the encoding quality that has been used more frequently than a certain threshold value (for example, average quality of the encoding quality that has been used more frequently than the certain threshold value), according to the compression history information.

As another example, the AI down-scaler 612 may determine the down-scaling target, based on the resolution, type (for example, a file format), or the like of the original image 105.

According to an embodiment, when the original image 105 includes a plurality of frames, the AI down-scaler 612 may independently determine down-scaling target for a certain number of frames, or may determine down-scaling target for entire frames.

According to an embodiment, the AI down-scaler 612 may divide the frames included in the original image 105 into a certain number of groups, and independently determine the down-scaling target for each group. The same or different down-scaling targets may be determined for each group. The number of frames included in the groups may be the same or different according to the each group.

According to another embodiment, the AI down-scaler 612 may independently determine a down-scaling target for each frame included in the original image 105. The same or different down-scaling targets may be determined for each frame.

Hereinafter, an example of a structure of a first DNN 700 on which AI down-scaling is based will be described.

Figure 8:
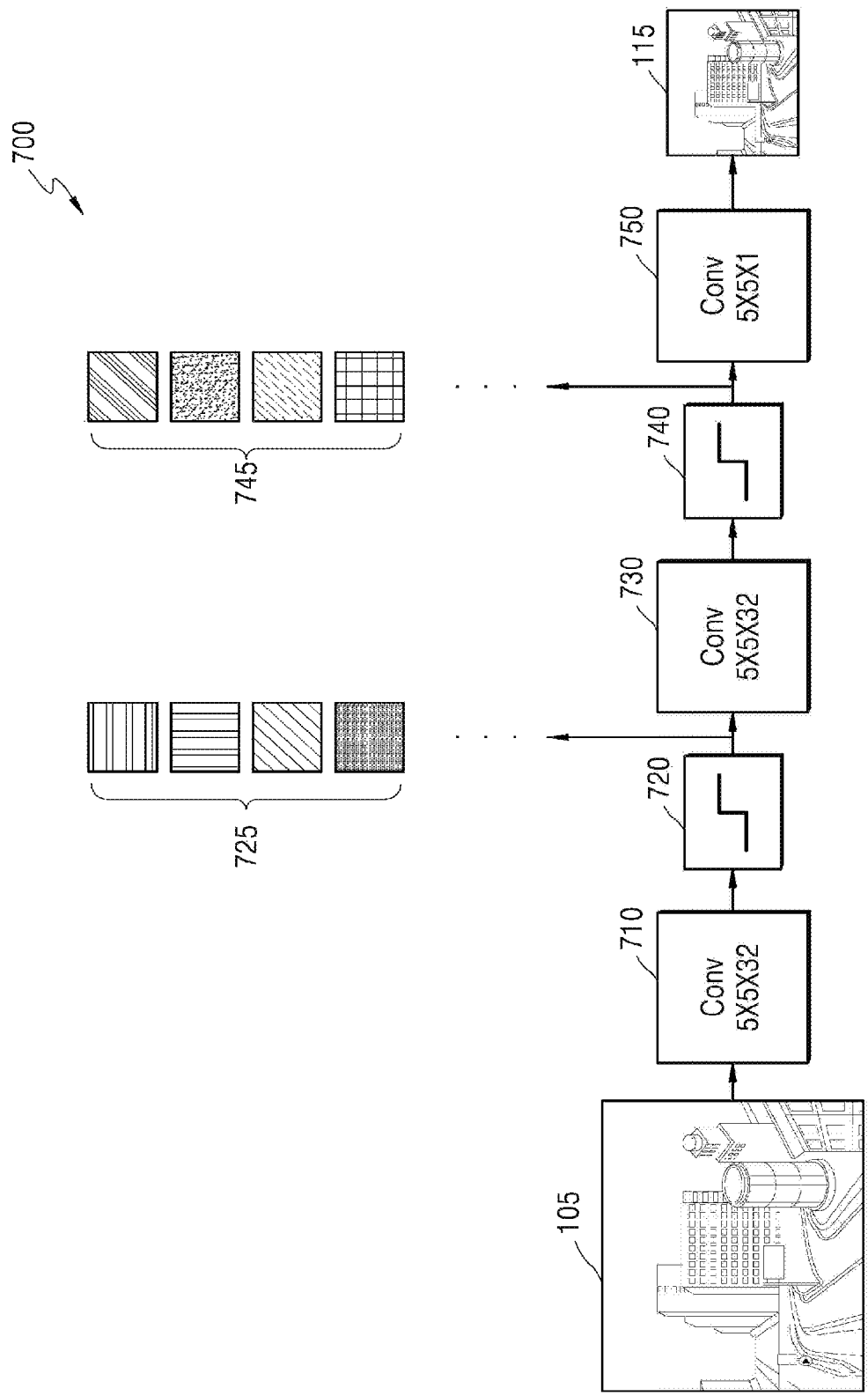
FIG. 8 is a diagram showing a first DNN for performing AI down-scaling on an original image.

FIG. 8 is a diagram showing the first DNN 700 for performing AI down-scaling on the original image 105.

As shown in FIG. 8, the original image 105 is input to a first convolution layer 710. The first convolution layer 710 performs a convolution process on the original image 105 by using 32 filter kernels having a size of 5×5. 32 feature maps generated as a result of the convolution process are input to a first activation layer 720. The first activation layer 720 may assign a non-linear feature to the 32 feature maps.

The first activation layer 720 determines whether to transmit sample values of the feature maps output from the first convolution layer 710 to the second convolution layer 730. For example, some of the sample values of the feature maps are activated by the first activation layer 720 and transmitted to the second convolution layer 730, and some of the sample values are deactivated by the first activation layer 720 and not transmitted to the second convolution layer 730. Information represented by the feature maps output from the first convolution layer 710 is emphasized by the first activation layer 720.

An output 725 of the first activation layer 720 is input to a second convolution layer 730. The second convolution layer 730 performs a convolution process on input data by using 32 filter kernels having a size of 5×5. 32 feature maps output as a result of the convolution process are input to a second activation layer 740, and the second activation layer 740 may assign a non-linear feature to the 32 feature maps.

An output 745 of the second activation layer 740 is input to a third convolution layer 750. The third convolution layer 750 performs a convolution process on input data by using one filter kernel having a size of 5×5. As a result of the convolution process, one image may be output from the third convolution layer 750. The third convolution layer 750 generates one output by using the one filter kernel as a layer for outputting a final image. According to an embodiment of the disclosure, the third convolution layer 750 may output the first image 115 as a result of a convolution operation.

There may be a plurality of pieces of DNN setting information indicating the numbers of filter kernels of the first, second, and third convolution layers 710, 730, and 750 of the first DNN 700, a parameter of each filter kernel of the first, second, and third convolution layers 710, 730, and 750 of the first DNN 700, and the like, and the plurality of pieces of DNN setting information may be connected to a plurality of pieces of DNN setting information of a second DNN. The connection between the plurality of pieces of DNN setting information of the first DNN and the plurality of pieces of DNN setting information of the second DNN may be realized via joint training of the first DNN and the second DNN.

In FIG. 8, the first DNN 700 includes three convolution layers (the first, second, and third convolution layers 710, 730, and 750) and two activation layers (the first and second activation layers 720 and 740), but this is only an example, and the numbers of convolution layers and activation layers may vary according to an embodiment. Also, according to an embodiment, the first DNN 700 may be implemented as an RNN. In this case, a CNN structure of the first DNN 700 according to an embodiment of the disclosure is changed to an RNN structure.

According to an embodiment, the AI down-scaler 612 may include at least one ALU for the convolution operation and the operation of the activation layer described above. The ALU may be implemented as a processor. For the convolution operation, the ALU may include a multiplier that performs multiplication between sample values of the original image 105 or the feature map output from previous layer and sample values of the filter kernel, and an adder that adds result values of the multiplication. Also, for the operation of the activation layer, the ALU may include a multiplier that multiplies an input sample value by a weight used in a pre-determined sigmoid function, a Tanh function, or an ReLU function, and a comparator that compares a multiplication result and a certain value to determine whether to transmit the input sample value to a next layer.

Referring back to FIG. 7, upon receiving the first image 115 from the AI down-scaler 612, the first encoder 614 may reduce an information amount of the first image 115 by performing first encoding on the first image 115. The image data corresponding to the first image 115 may be obtained as a result of performing the first encoding by the first encoder 614.

The data processor 632 processes at least one of the AI data or the image data to be transmitted in a certain form. For example, when the AI data and the image data are to be transmitted in a form of a bitstream, the data processor 632 may process the AI data to be expressed in a form of a bitstream, and transmit the image data and the AI data in a form of one bitstream through the communicator 634. As another example, the data processor 632 may process the AI data to be expressed in a form of bitstream, and transmit each of a bitstream corresponding to the AI data and a bitstream corresponding to the image data through the communicator 634. As another example, the data processor 632 may process the AI data to be expressed in a form of a frame or packet, and transmit the image data in a form of a bitstream and the AI data in a form of a frame or packet through the communicator 634.

The communicator 634 transmits AI encoding data obtained as a result of performing AI encoding, through a network. The AI encoding data obtained as the result of performing AI encoding includes the image data and the AI data. The image data and the AI data may be transmitted through a same type of network or different types of networks.

According to an embodiment, the AI encoding data obtained as a result of processes of the data processor 632 may be stored in a data storage medium including a magnetic medium such as a hard disk, a floppy disk, or a magnetic tape, an optical recording medium such as CD-ROM or DVD, or a magneto-optical medium such as a floptical disk.

Hereinafter, a method of jointly training the first DNN 700 and the second DNN 300 will be described with reference to FIG. 9.

Figure 9:
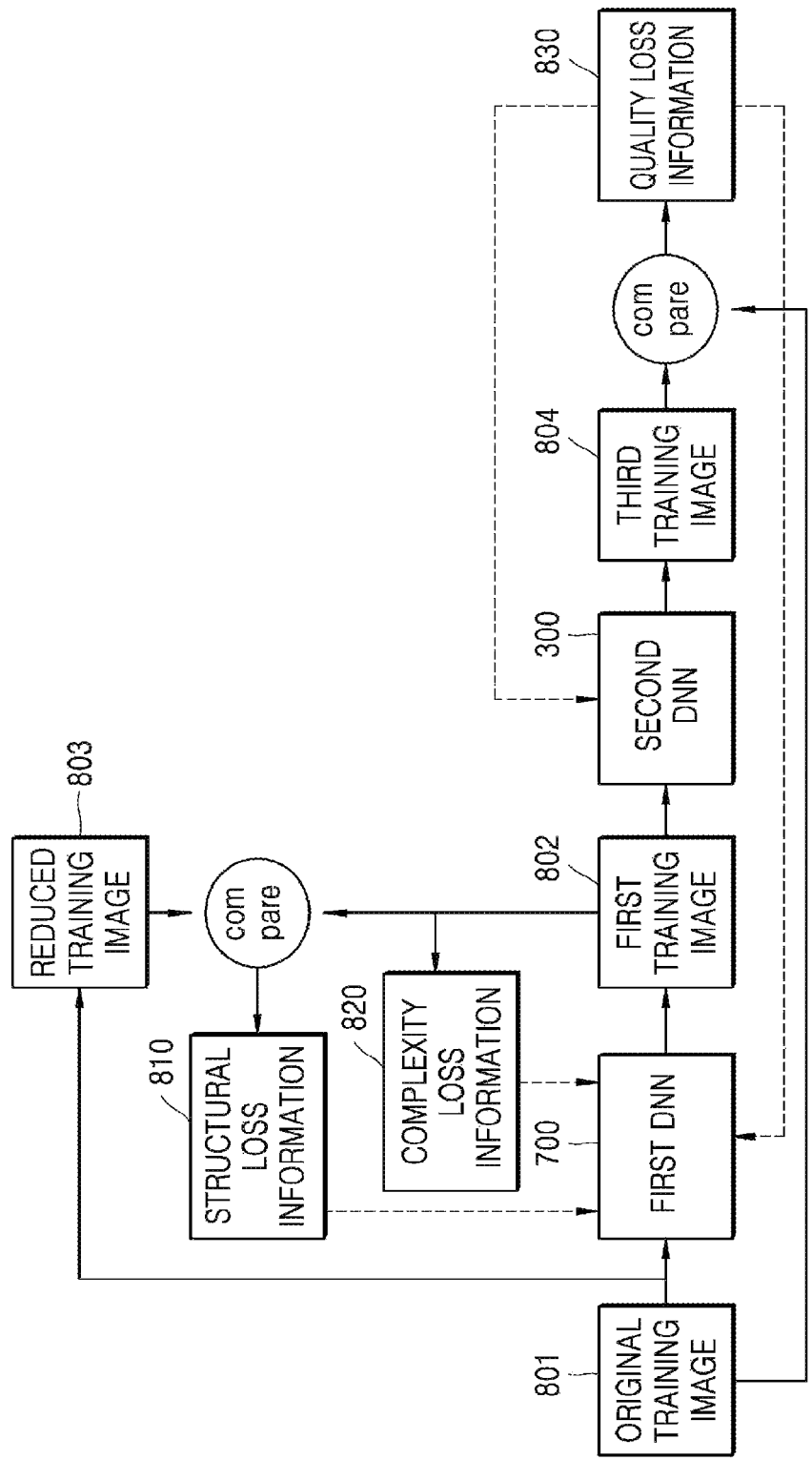
FIG. 9 is a diagram for describing a method of training a first DNN and a second DNN.

FIG. 9 is a diagram for describing a method of training the first DNN 700 and the second DNN 300.

In an embodiment, the original image 105 on which AI encoding is performed through an AI encoding process is reconstructed to the third image 145 via an AI decoding process, and in order to maintain similarity between the original image 105 and the third image 145 obtained as a result of AI decoding, connectivity is between the AI encoding process and the AI decoding process is required. In other words, information lost in the AI encoding process needs to be reconstructed during the AI decoding process, and in this regard, the first DNN 700 and the second DNN 300 need to be jointly trained.

For accurate AI decoding, ultimately, quality loss information 830 corresponding to a result of comparing a third training image 804 and an original training image 801 shown in FIG. 9 needs to be reduced. Accordingly, the quality loss information 830 is used to train both of the first DNN 700 and the second DNN 300.

First, a training process shown in FIG. 9 will be described.

In FIG. 9, the original training image 801 is an image on which AI down-scaling is to be performed and a first training image 802 is an image obtained by performing AI down-scaling on the original training image 801. Also, the third training image 804 is an image obtained by performing AI up-scaling on the first training image 802.

The original training image 801 includes a still image or a moving image including a plurality of frames. According to an embodiment, the original training image 801 may include a luminance image extracted from the still image or the moving image including the plurality of frames. Also, according to an embodiment, the original training image 801 may include a patch image extracted from the still image or the moving image including the plurality of frames. When the original training image 801 includes the plurality of frames, the first training image 802, the second training image, and the third training image 804 also each include a plurality of frames. When the plurality of frames of the original training image 801 are sequentially input to the first DNN 700, the plurality of frames of the first training image 802, the second training image and the third training image 804 may be sequentially obtained through the first DNN 700 and the second DNN 300.

For joint training of the first DNN 700 and the second DNN 300, the original training image 801 is input to the first DNN 700. The original training image 801 input to the first DNN 700 is output as the first training image 802 via the AI down-scaling, and the first training image 802 is input to the second DNN 300. The third training image 804 is output as a result of performing the AI up-scaling on the first training image 802.

Referring to FIG. 9, the first training image 802 is input to the second DNN 300, and according to an embodiment, a second training image obtained as first encoding and first decoding are performed on the first training image 802 may be input to the second DNN 300. In order to input the second training image to the second DNN 300, any one codec among MPEG-2, H.264, MPEG-4, HEVC, VC-1, VP8, VP9, and AV1 may be used. In particular, any one codec among MPEG-2, H.264, MPEG-4, HEVC, VC-1, VP8, VP9, and AV1 may be used to perform first encoding on the first training image 802 and first decoding on image data corresponding to the first training image 802.

Referring to FIG. 9, separate from the first training image 802 being output through the first DNN 700, a reduced training image 803 obtained by performing legacy down-scaling on the original training image 801 is obtained. Here, the legacy down-scaling may include at least one of bilinear scaling, bicubic scaling, lanczos scaling, or stair step scaling.

In order to prevent a structural feature of the first image 115 from deviating greatly from a structural feature of the original image 105, the reduced training image 803 is obtained to preserve the structural feature of the original training image 801.

Before training is performed, the first DNN 700 and the second DNN 300 may be set to pre-determined DNN setting information. When the training is performed, structural loss information 810, complexity loss information 820, and the quality loss information 830 may be determined.

The structural loss information 810 may be determined based on a result of comparing the reduced training image 803 and the first training image 802. For example, the structural loss information 810 may correspond to a difference between structural information of the reduced training image 803 and structural information of the first training image 802. Structural information may include various features extractable from an image, such as luminance, contrast, histogram, or the like of the image. The structural loss information 810 indicates how much structural information of the original training image 801 is maintained in the first training image 802. When the structural loss information 810 is small, the structural information of the first training image 802 is similar to the structural information of the original training image 801.

The complexity loss information 820 may be determined based on spatial complexity of the first training image 802. For example, a total variance value of the first training image 802 may be used as the spatial complexity. The complexity loss information 820 is related to a bitrate of image data obtained by performing first encoding on the first training image 802. It is defined that the bitrate of the image data is low when the complexity loss information 820 is small.

The quality loss information 830 may be determined based on a result of comparing the original training image 801 and the third training image 804. The quality loss information 830 may include at least one of an L1-norm value, an L2-norm value, an Structural Similarity (SSIM) value, a Peak Signal-To-Noise Ratio-Human Vision System (PSNR-HVS) value, an Multiscale SSIM (MS-SSIM) value, a Variance Inflation Factor (VIF) value, or a Video Multi-method Assessment Fusion (VMAF) value regarding the difference between the original training image 801 and the third training image 804. The quality loss information 830 indicates how similar the third training image 804 is to the original training image 801. The third training image 804 is more similar to the original training image 801 when the quality loss information 830 is small.

Referring to FIG. 9, the structural loss information 810, the complexity loss information 820 and the quality loss information 830 are used to train the first DNN 700, and the quality loss information 830 is used to train the second DNN 300. In other words, the quality loss information 830 is used to train both the first and second DNNs 700 and 300.

The first DNN 700 may update a parameter such that final loss information determined based on the first through quality loss information 810 through 830 is reduced or minimized. Also, the second DNN 300 may update a parameter such that the quality loss information 830 is reduced or minimized.

The final loss information for training the first DNN 700 and the second DNN 300 may be determined as Equation 1 below.

$$\text{Loss}DS = a \times \text{Structural loss information} + b \times \text{Complexity loss information} + c \times \text{Quality loss information}$$

$$\text{Loss}US = d \times \text{Quality loss information} \quad \text{[Equation 1]}$$

In Equation 1, LossDS indicates final loss information to be reduced or minimized to train the first DNN 700, and LossUS indicates final loss information to be reduced or minimized to train the second DNN 300. Also, a, b, c and d may be pre-determined certain weights.

In other words, the first DNN 700 updates parameters in a direction LossDS of Equation 1 is reduced, and the second DNN 300 updates parameters in a direction LossUS is reduced. When the parameters of the first DNN 700 are updated according to LossDS derived during the training, the first training image 802 obtained based on the updated parameters becomes different from a previous first training image 802 obtained based on not updated parameters, and accordingly, the third training image 804 also becomes different from a previous third training image 804. When the third training image 804 becomes different from the previous third training image 804, the quality loss information 830 is also newly determined, and the second DNN 300 updates the parameters accordingly. When the quality loss information 830 is newly determined, LossDS is also newly determined, and the first DNN 700 updates the parameters according to newly determined LossDS. In other words, updating of the parameters of the first DNN 700 leads to updating of the parameters of the second DNN 300, and updating of the parameters of the second DNN 300 leads to updating of the parameters of the first DNN 700. In other words, because the first DNN 700 and the second DNN 300 are jointly trained by sharing the quality loss information 830, the parameters of the first DNN 700 and the parameters of the second DNN 300 may be jointly optimized.

Referring to Equation 1, it is verified that LossUS is determined according to the quality loss information 830, but this is only an example and LossUS may be determined based on at least one of the structural loss information 810 and the complexity loss information 820, and the quality loss information 830.

Hereinabove, it has been described that the AI up-scaler 234 of the AI decoding apparatus 200 and the AI down-scaler 612 of the AI encoding apparatus 600 store the plurality of pieces of DNN setting information, and methods of training each of the plurality of pieces of DNN setting information stored in the AI up-scaler 234 and the AI down-scaler 612 will now be described.

As described with reference to Equation 1, the first DNN 700 updates the parameters considering the similarity (the structural loss information 810) between the structural information of the first training image 802 and the structural information of the original training image 801, the bitrate (the complexity loss information 820) of the image data obtained as a result of performing first encoding on the first training image 802, and the difference (the quality loss information 830) between the third training image 804 and the original training image 801.

In particular, the parameters of the first DNN 700 may be updated such that the first training image 802 having similar structural information as the original training image 801 is obtained and the image data having a small bitrate is obtained when first encoding is performed on the first training image 802, and at the same time, the second DNN 300 performing AI up-scaling on the first training image 802 obtains the third training image 804 similar to the original training image 801.

A direction in which the parameters of the first DNN 700 are optimized may vary by adjusting the weights a, b, and c of Equation 1. For example, when the weight b is determined to be high, the parameters of the first DNN 700 may be updated by prioritizing a low bitrate over high quality of the third training image 804. Also, when the weight c is determined to be high, the parameters of the first DNN 700 may be updated by prioritizing high quality of the third training image 804 over a high bitrate or maintaining of the structural information of the original training image 801.

Also, the direction in which the parameters of the first DNN 700 are optimized may vary according to a type of codec used to perform first encoding on the first training image 802. This is because the second training image to be input to the second DNN 300 may vary according to the type of codec.

In other words, the parameters of the first DNN 700 and the parameters of the second DNN 300 may be jointly updated based on the weights a, b, and c, and the type of codec for performing first encoding on the first training image 802. Accordingly, when the first DNN 700 and the second DNN 300 are trained after determining the weights a, b, and c each to a certain value and determining the type of codec to a certain type, the parameters of the first DNN 700 and the parameters of the second DNN 300 connected and optimized to each other may be determined.

Also, when the first DNN 700 and the second DNN 300 are trained after changing the weights a, b, and c, and the type of codec, the parameters of the first DNN 700 and the parameters of the second DNN 300 connected and optimized to each other may be determined. In other words, the plurality of pieces of DNN setting information jointly trained with each other may be determined in the first DNN 700 and the second DNN 300 when the first DNN 700 and the second DNN 300 are trained while changing values of the weights a, b, and c, and the type of codec.

As described above with reference to FIG. 5, the plurality of pieces of DNN setting information of the first DNN 700 and the second DNN 300 may be mapped to the information related to the first image. To set such a mapping relationship, first encoding may be performed on the first training image 802 output from the first DNN 700 via a certain codec according to a certain bitrate and the second training image obtained by performing first decoding on a bitstream obtained as a result of performing the first encoding may be input to the second DNN 300. In other words, by training the first DNN 700 and the second DNN 300 after setting an environment such that the first encoding is performed on the first training image 802 of a certain resolution via the certain codec according to the certain bitrate, a DNN setting information pair mapped to the resolution of the first training image 802, a type of the codec used to perform the first encoding on the first training image 802, and the bitrate of the bitstream obtained as a result of performing the first encoding on the first training image 802 may be determined. By variously changing the resolution of the first training image 802, the type of codec used to perform the first encoding on the first training image 802 and the bitrate of the bitstream obtained according to the first encoding of the first training image 802, the mapping relationships between the plurality of DNN setting information of the first DNN 700 and the second DNN 300 and the pieces of information related to the first image may be determined.

Figure 10:
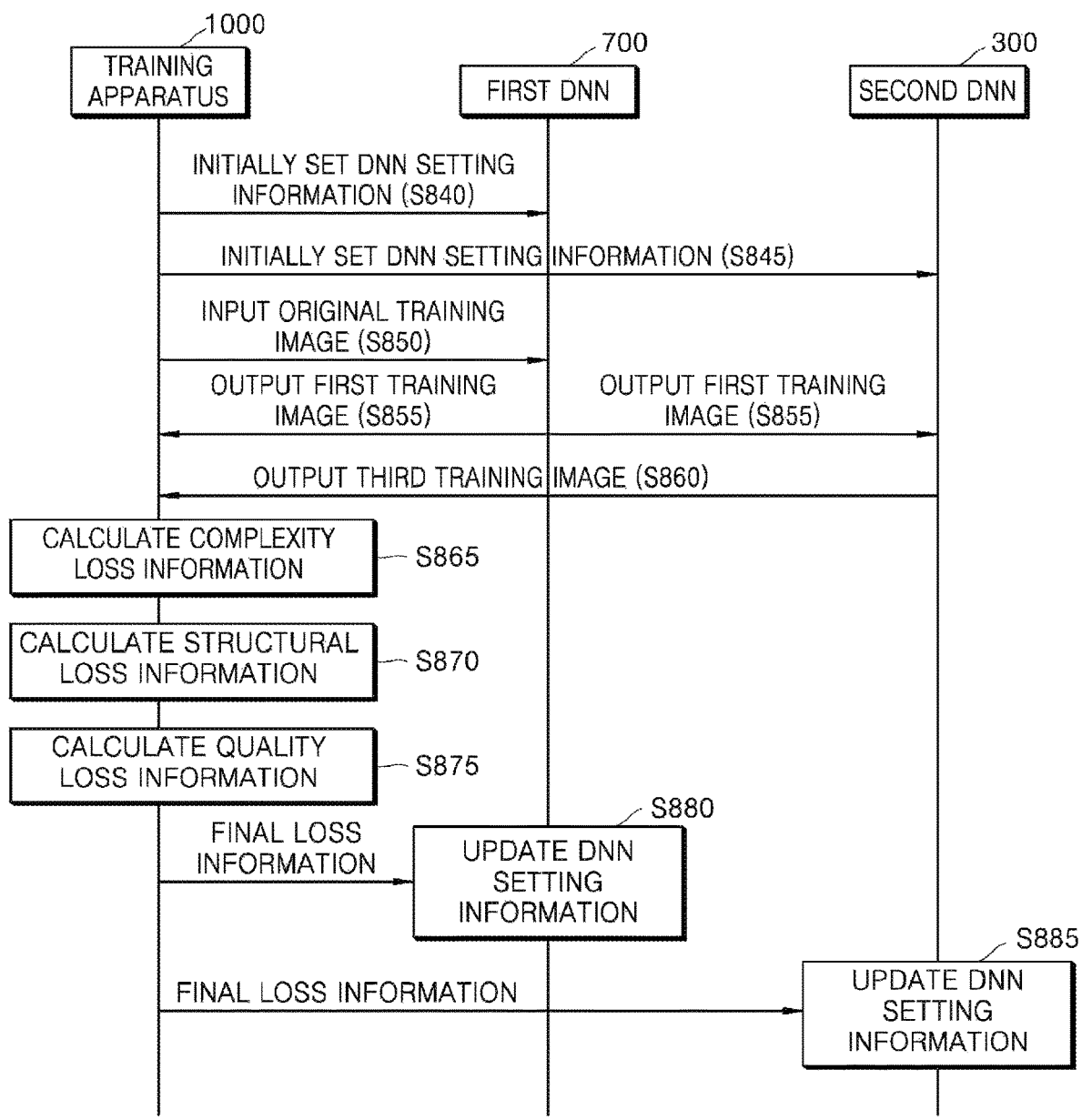
FIG. 10 is a diagram for describing a training process of a first DNN and a second DNN by a training apparatus.

FIG. 10 is a diagram for describing training processes of the first DNN 700 and the second DNN by a training apparatus 1000.

The training of the first DNN 700 and the second DNN 300 described with reference FIG. 9 may be performed by the training apparatus 1000. The training apparatus 1000 includes the first DNN 700 and the second DNN 300. The training apparatus 1000 may be, for example, the AI encoding apparatus 600 or a separate server. The DNN setting information of the second DNN 300 obtained as the training result is stored in the AI decoding apparatus 200.

Referring to FIG. 10, the training apparatus 1000 initially sets the DNN setting information of the first DNN 700 and the second DNN 300, in operations S840 and S845. Accordingly, the first DNN 700 and the second DNN 300 may operate according to pre-determined DNN setting information. The DNN setting information may include information about at least one of the number of convolution layers included in the first DNN 700 and the second DNN 300, the number of filter kernels for each convolution layer, the size of a filter kernel for each convolution layer, or a parameter of each filter kernel.

The training apparatus 1000 inputs the original training image 801 into the first DNN 700, in operation S850. The original training image 801 may include a still image or at least one frame included in a moving image.

The first DNN 700 processes the original training image 801 according to the initially set DNN setting information and outputs the first training image 802 obtained by performing AI down-scaling on the original training image 801, in operation S855. In FIG. 10, the first training image 802 output from the first DNN 700 is directly input to the second DNN 300, but the first training image 802 output from the first DNN 700 may be input to the second DNN 300 by the training apparatus 1000. Also, the training apparatus 1000 may perform first encoding and first decoding on the first training image 802 via a certain codec, and then input the second training image to the second DNN 300.

The second DNN 300 processes the first training image 802 or the second training image according to the initially set DNN setting information and outputs the third training image 804 obtained by performing AI up-scaling on the first training image 802 or the second training image, in operation S860.

The training apparatus 1000 calculates the complexity loss information 820, based on the first training image 802, in operation S865.

The training apparatus 1000 calculates the structural loss information 810 by comparing the reduced training image 803 and the first training image 802, in operation S870.

The training apparatus 1000 calculates the quality loss information 830 by comparing the original training image 801 and the third training image 804, in operation S875.

The initially set DNN setting information is updated in operation S880 via a back propagation process based on the final loss information. The training apparatus 1000 may calculate the final loss information for training the first DNN 700, based on the complexity loss information 820, the structural loss information 810, and the quality loss information 830.

The second DNN 300 updates the initially set DNN setting information in operation S885 via a back propagation process based on the quality loss information 830 or the final loss information. The training apparatus 1000 may calculate the final loss information for training the second DNN 300, based on the quality loss information 830.

Then, the training apparatus 1000, the first DNN 700, and the second DNN 300 may repeat operations S850 through S885 until the final loss information is minimized to update the DNN setting information. At this time, during each repetition, the first DNN 700 and the second DNN 300 operate according to the DNN setting information updated in the previous operation.

Table 1 below shows effects when AI encoding and AI decoding are performed on the original image 105 according to an embodiment of the disclosure and when encoding and decoding are performed on the original image 105 via HEVC.

TABLE 1

| Content | Resolution | Frame Number | Information Amount (Bitrate )(Mbps) | | Subjective Image Quality Score (VMAF) | |
|---|---|---|---|---|---|---|
| | | | HEVC | AI Encoding/ AI Decoding | HEVC | AI Encoding/ AIDecoding |
| Content_01 | 8 K | 300 | 46.3 | 21.4 | 94.80 | 93.54 |
| Content_02 | (7680 ×4320) | frames | 46.3 | 21.6 | 98.05 | 98.98 |
| Content_03 | | | 46.3 | 22.7 | 96.08 | 96.00 |
| Content_04 | | | 46.1 | 22.1 | 86.26 | 92.00 |
| Content_05 | | | 45.4 | 22.7 | 93.42 | 92.98 |
| Content_06 | | | 46.3 | 23.0 | 95.99 | 95.61 |
| | | Average | 46.11 | 22.25 | 94.10 | 94.85 |

As shown in Table 1, despite subjective image quality when AI encoding and AI decoding are performed on content including 300 frames of 8 K resolution, according to an embodiment of the disclosure, is higher than subjective image quality when encoding and decoding are performed via HEVC, a bitrate is reduced by at least 50%.

Figure 11:
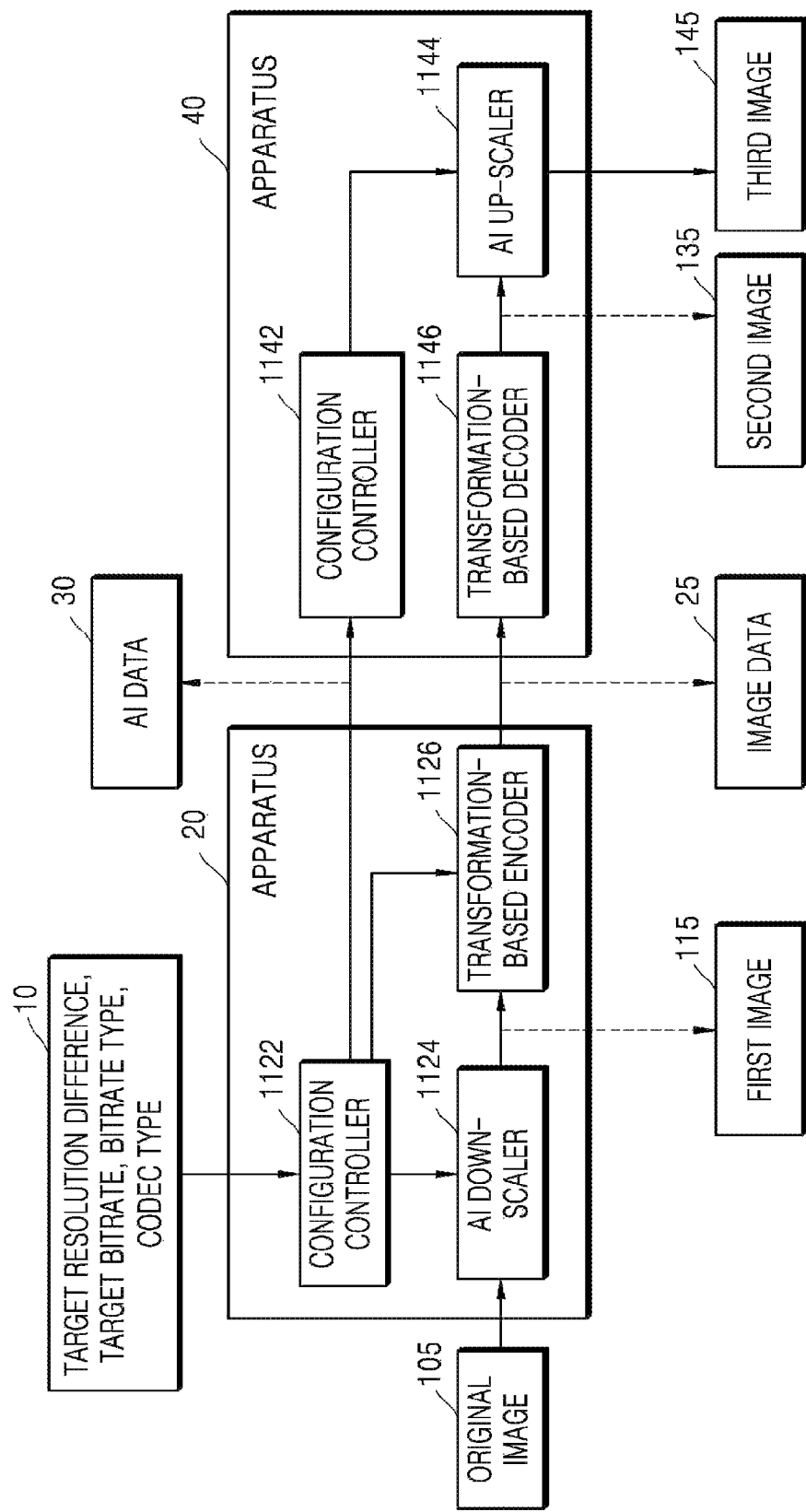
FIG. 11 is a diagram of an apparatus for performing AI down-scaling on an original image and an apparatus for performing AI up-scaling on a second image.

FIG. 11 is a diagram of an apparatus 20 for performing AI down-scaling on the original image 105 and an apparatus 40 for performing AI up-scaling on the second image 135.

The apparatus 20 receives the original image 105 and provides image data 25 and AI data 30 to the apparatus 40 by using an AI down-scaler 1124 and a transformation-based encoder 1126. According to an embodiment, the image data 25 corresponds to the image data of FIG. 1 and the AI data 30 corresponds to the AI data of FIG. 1. Also, according to an embodiment, the transformation-based encoder 1126 corresponds to the first encoder 614 of FIG. 7 and the AI down-scaler 1124 corresponds to the AI down-scaler 612 of FIG. 7.

The apparatus 40 receives the AI data 30 and the image data 25 and obtains the third image 145 by using a transformation-based decoder 1146 and an AI up-scaler 1144. According to an embodiment, the transformation-based decoder 1146 corresponds to the first decoder 232 of FIG. 2 and the AI up-scaler 1144 corresponds to the AI up-scaler 234 of FIG. 2.

According to an embodiment, the apparatus 20 includes a CPU, a memory, and a computer program including instructions. The computer program is stored in the memory. According to an embodiment, the apparatus 20 performs functions to be described with reference to FIG. 11 according to execution of the computer program by the CPU. According to an embodiment, the functions to be described with reference to FIG. 11 are performed by a dedicated hardware chip and/or the CPU.

According to an embodiment, the apparatus 40 includes a CPU, a memory, and a computer program including instructions. The computer program is stored in the memory. According to an embodiment, the apparatus 40 performs functions to be described with reference to FIG. 11 according to execution of the computer program by the CPU. According to an embodiment, the functions to be described with reference to FIG. 11 are performed by a dedicated hardware chip and/or the CPU.

In FIG. 11, a configuration controller 1122 receives at least one input value 10. According to an embodiment, the at least one input value 10 may include at least one of a target resolution difference for the AI down-scaler 1124 and the AI up-scaler 1144, a bitrate of the image data 25, a bitrate type of the image data 25 (for example, a variable bitrate type, a constant bitrate type, or an average bitrate type), or a codec type for the transformation-based encoder 1126. The at least one input value 10 may include a value pre-stored in the apparatus 20 or a value input from a user.

The configuration controller 1122 controls operations of the AI down-scaler 1124 and the transformation-based encoder 1126, based on the received input value 10. According to an embodiment, the configuration controller 1122 obtains DNN setting information for the AI down-scaler 1124 according to the received input value 10, and sets the AI down-scaler 1124 with the obtained DNN setting information. According to an embodiment, the configuration controller 1122 may transmit the received input value 10 to the AI down-scaler 1124 and the AI down-scaler 1124 may obtain the DNN setting information for performing AI down-scaling on the original image 105, based on the received input value 10. According to an embodiment, the configuration controller 1122 may provide, to the AI down-scaler 1124, additional information, for example, color format (luminance component, chrominance component, red component, green component, or blue component) information to which AI down-scaling is applied and tone mapping information of a high dynamic range (HDR), together with the input value 10, and the AI down-scaler 1124 may obtain the DNN setting information considering the input value 10 and the additional information. According to an embodiment, the configuration controller 1122 transmits at least a part of the received input value 10 to the transformation-based encoder 1126 and the transformation-based encoder 1126 performs first encoding on the first image 115 via a bitrate of a certain value, a bitrate of a certain type, and a certain codec.

The AI down-scaler 1124 receives the original image 105 and performs an operation described with reference to at least one of FIG. 1, 7, 8, 9, or 10 to obtain the first image 115.

According to an embodiment, the AI data 30 is provided to the apparatus 40. The AI data 30 may include at least one of resolution difference information between the original image 105 and the first image 115, or information related to the first image 115. The resolution difference information may be determined based on the target resolution difference of the input value 10, and the information related to the first image 115 may be determined based on at least one of a target bitrate, the bitrate type, or the codec type. According to an embodiment, the AI data 30 may include parameters used during the AI up-scaling. The AI data 30 may be provided from the AI down-scaler 1124 to the apparatus 40.

The image data 25 is obtained as the original image 105 is processed by the transformation-based encoder 1126, and is transmitted to the apparatus 40. The transformation-based encoder 1126 may process the first image 115 according to MPEG-2, H.264 AVC, MPEG-4, HEVC, VC-1, VP8, VP9, or VA1.

A configuration controller 1142 controls an operation of the AI up-scaler 1144, based on the AI data 30. According to an embodiment, the configuration controller 1142 obtains the DNN setting information for the AI up-scaler 1144 according to the received AI data 30, and sets the AI up-scaler 1144 with the obtained DNN setting information.

According to an embodiment, the configuration controller 1142 may transmit the received AI data 30 to the AI up-scaler 1144 and the AI up-scaler 1144 may obtain the DNN setting information for performing AI up-scaling on the second image 135, based on the AI data 30. According to an embodiment, the configuration controller 1142 may provide, to the AI up-scaler 1144, additional information, for example, the color format (luminance component, chrominance component, red component, green component, or blue component) information to which AI up-scaling is applied, and the tone mapping information of HDR, together with the AI data 30, and the AI up-scaler 1144 may obtain the DNN setting information considering the AI data 30 and the additional information. According to an embodiment, the AI up-scaler 1144 may receive the AI data 30 from the configuration controller 1142, receive at least one of prediction mode information, motion information, or quantization parameter information from the transformation-based decoder 1146, and obtain the DNN setting information based on the AI data 30 and at least one of the prediction mode information, the motion information, and the quantization parameter information.

The transformation-based decoder 1146 may process the image data 25 to reconstruct the second image 135. The transformation-based decoder 1146 may process the image data 25 according to MPEG-2, H.264 AVC, MPEG-4, HEVC, VC-1, VP8, VP9, or AV1.

The AI up-scaler 1144 may obtain the third image 145 by performing AI up-scaling on the second image 135 provided from the transformation-based decoder 1146, based on the set DNN setting information.

The AI down-scaler 1124 may include a first DNN and the AI up-scaler 1144 may include a second DNN, and according to an embodiment, DNN setting information for the first DNN and second DNN are trained according to the training method described with reference to FIGS. 9 and 10.

Figure 12:
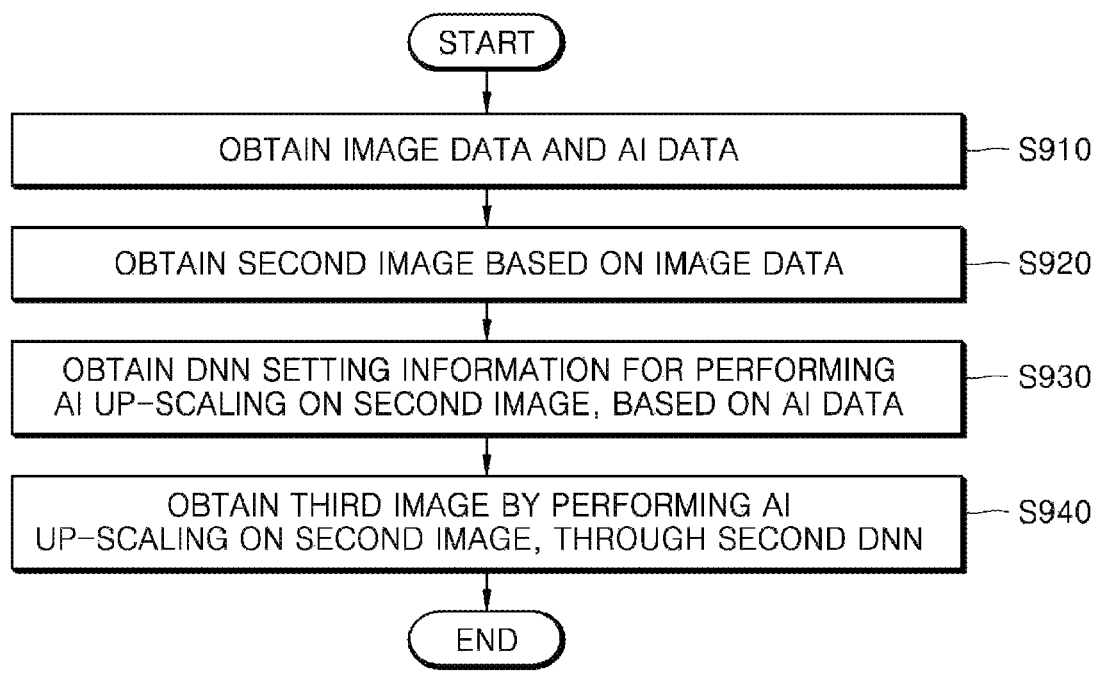
FIG. 12 is a flowchart of an AI decoding method according to an embodiment.

FIG. 12 is a flowchart of an AI decoding method according to an embodiment.

In operation S910, the AI decoding apparatus 200 receives AI encoding data including image data and AI data. The AI decoding apparatus 200 may receive the AI encoding data from the AI encoding apparatus 600 through a network. The AI decoding apparatus 200 may obtain the AI encoding data stored in a data storage medium.

In operation S920, the AI decoding apparatus 200 obtains the second image 135 based on the image data. In particular, the AI decoding apparatus 200 reconstructs the second image 135 corresponding to the first image 115 by decoding the image data based on an image reconstruction method using frequency transform.

In operation S930, the AI decoding apparatus 200 obtains DNN setting information for performing AI up-scaling on the second image 135, from among a pre-stored plurality of pieces of DNN setting information. Because each of the plurality of pieces of DNN setting information is jointly optimized with each of a plurality of pieces of DNN setting information used to perform AI down-scaling on the original image 105, the DNN setting information enabling AI up-scaling to be performed on the second image 135 according to an up-scaling target matching a down-scaling target of the original image 105 needs to be selected.

In operation S940, the AI decoding apparatus 200 obtains the third image 145 obtained by performing AI up-scaling on the second image 135, through a second DNN operating with the DNN setting information obtained in operation S930. The third image 145 may be output from the AI decoding apparatus 200 and displayed through a display device or may be displayed after being post-processed.

When the DNN setting information is pre-set in the second DNN and the DNN setting information selected in operation S930 is different from the pre-set DNN setting information, the AI decoding apparatus 200 sets the second DNN to the selected DNN setting information.

Figure 13:
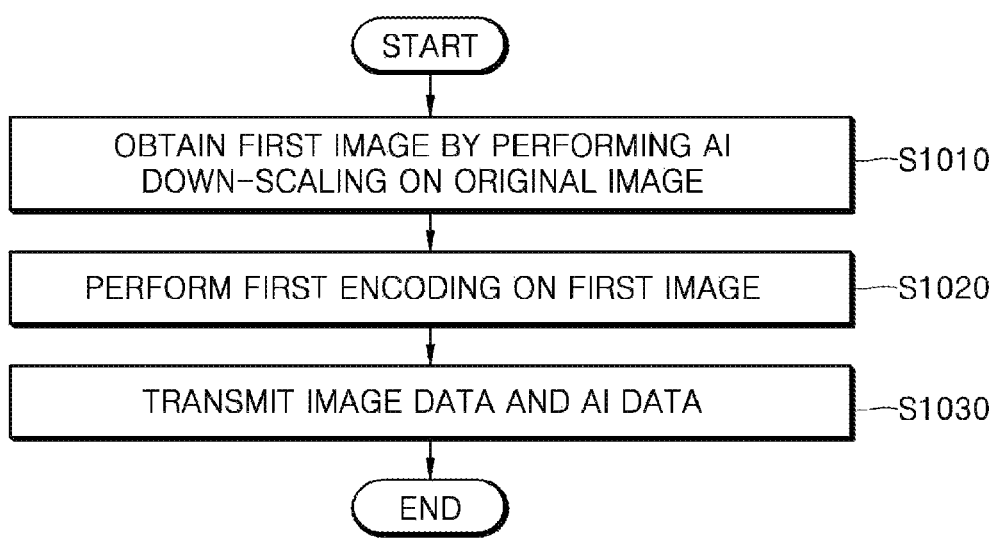
FIG. 13 is a flowchart of an AI encoding method according to an embodiment.

FIG. 13 is a flowchart of an AI encoding method according to an embodiment.

In operation S1010, the AI encoding apparatus 600 obtains the first image 115 obtained by performing AI down-scaling the original image 105, through a first DNN.

The AI encoding apparatus 600 may determine a down-scaling target based on a certain standard, and obtain DNN setting information corresponding to the down-scaling target from among a pre-stored plurality of pieces of DNN setting information. Also, the AI encoding apparatus 600 may perform AI down-scaling on the original image 105 through the first DNN operating according to the obtained DNN setting information.

In operation S1020, the AI encoding apparatus 600 obtains image data by performing first encoding on the first image 115. In particular, the AI encoding apparatus 600 obtains the image data corresponding to the first image 115 by encoding the first image 115 based on an image compression method using frequency transform.

In operation S1030, the AI encoding apparatus 600 transmits AI encoding data including the image data and AI data including information related to AI down-scaling. The AI data includes information for selecting DNN setting information of a second DNN for AI up-scaling of the second image 135. According to an embodiment, the AI encoding data may be stored in a data storage medium.

As described above, because the first DNN and the second DNN are jointly trained, when the AI encoding apparatus 600 performs AI down-scaling on the original image 105 to a particular down-scaling target, the AI decoding apparatus 200 performs AI up-scaling on the second image 135 to an up-scaling target corresponding to the down-scaling target.

Accordingly, the AI data includes information enabling the AI decoding apparatus 200 to perform AI up-scaling on the second image 135 to the up-scaling target corresponding to the down-scaling target of the original image 105. In particular, the AI data includes information used to obtain DNN setting information corresponding to the up-scaling target.

Upon receiving the AI data, the AI decoding apparatus 200 is able to infer or verify which DNN setting information is used by the AI encoding apparatus 600 to perform AI down-scaling on the original image 105, and accordingly, may obtain DNN setting information corresponding to the DNN setting information used to perform AI down-scaling, and perform AI up-scaling by using the obtained DNN setting information.

Meanwhile, the embodiments of the disclosure described above may be written as computer-executable programs or instructions that may be stored in a medium.

The medium may continuously store the computer-executable programs or instructions, or temporarily store the computer-executable programs or instructions for execution or downloading. Also, the medium may be any one of various recording media or storage media in which a single piece or plurality of pieces of hardware are combined, and the medium is not limited to a medium directly connected to a computer system, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

Meanwhile, a model related to the DNN described above may be implemented via a software module. When the DNN model is implemented via a software module (for example, a program module including instructions), the DNN model may be stored in a computer-readable recording medium.

Also, the DNN model may be a part of the AI decoding apparatus 200 or AI encoding apparatus 600 described above by being integrated in a form of a hardware chip. For example, the DNN model may be manufactured in a form of an dedicated hardware chip for AI, or may be manufactured as a part of an existing general-purpose processor (for example, CPU or application processor) or a graphic-dedicated processor (for example GPU).

Also, the DNN model may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server of the manufacturer or electronic market, or a storage medium of a relay server.

While one or more embodiments of the disclosure have been described with reference to the figures, it will be understood by those of ordinary skill in the art that various changes in form and details may be made therein without departing from the spirit and scope as defined by the following claims.

What is claimed is:

1. An electronic device for displaying an image by using artificial intelligence (AI), the electronic device comprising:
   a display; and
   one or more processors, when executing one or more instructions stored in the electronic device, configured to:
      receive, from a server, AI data related to AI down-scaling an original image to a first image through a down-scaling neural network (NN) based on first NN setting information, and an image data generated through an encoding on the first image, the first NN setting information being selected from a plurality of first NN setting information that are stored in the server;
      obtain a second image by decoding the image data;
      select, based on the AI data, second NN setting information paired with the selected first NN setting information from a plurality of second NN setting information that are stored in the electronic device;
      obtain, by an up-scaling NN, a third image by performing AI up-scaling on the obtained second image, the up-scaling NN being set with the selected second NN setting information; and
      provide, on the display, the obtained third image,
   wherein the plurality of first NN setting information and the plurality of second NN setting information are obtained through joint training of the up-scaling NN and the down-scaling NN.

2. The electronic device of claim 1, wherein the AI data comprises information related to the first image, wherein the one or more processors, when executing the one or more instructions, are further configured to select the second NN setting information mapped to the information related to the first image, based on a mapping relationship between a plurality of image-related information and the plurality of second NN setting information.

3. The electronic device of claim 1, wherein the AI data further comprises at least one of a quantization parameter regarding the image data, a resolution of the first image, or a codec type used to encode the first image.

4. The electronic device of claim 1, wherein the selected second NN setting information comprises neural network parameters for at least one convolution layer in the up-scaling NN.

5. A server for providing an image by using an artificial intelligence (AI), the server comprising:
   one or more processors configured to execute one or more instructions stored in the server to:
   select first neural network (NN) setting information from a plurality of first NN setting information that are stored in the server;
   obtain, by a down-scaling NN, a first image by performing AI down-scaling on an original image, the down-scaling NN being set with the selected first NN setting information;
   encode the first image to obtain image data; and
   provide an electronic device with the image data and AI data related to the AI down-scaling, the AI data being used to select second NN setting information paired with the selected first NN setting information from a plurality of second NN setting information for AI up-scaling that are stored in the electronic device,
   wherein the AI up-scaling is performed by an up-scaling NN set with the selected second NN setting information, and
   wherein the plurality of first NN setting information and the plurality of second NN setting information are obtained through joint training of the up-scaling NN and the down-scaling NN.

6. The server of claim 5, wherein the one or more processors is configured to select the first NN setting information from the plurality of first NN setting information based on a compression ratio input from a user.

7. The server of claim 5, wherein the one or more processors is configured to select the first NN setting information from the plurality of first NN setting information based on compression history information.

8. The server of claim 5, wherein the one or more processors is configured to select the first NN setting information from the plurality of first NN setting information based on at least one of a resolution of the original image or a type of the original image.

9. The server of claim 5, wherein the AI data further comprises at least one of a quantization parameter regarding the image data, a resolution of the first image, or a codec type used to encode the first image.

10. A non-transitory computer-readable recording medium having recorded thereon instructions, which when executed by an electronic device, cause the electronic device to perform first operations comprising:
   receiving, from a server, artificial intelligence (AI) data related to AI down-scaling an original image to a first image through a down-scaling neural network (NN) based on first NN setting information, and image data corresponding to an encoding result on the first image, the first NN setting information being selected from a plurality of first NN setting information that are stored in the server;
   decoding the image data to obtain a second image; and
   providing, on a display of the electronic device, a third image that is obtained by performing AI up-scaling on the second image, and
   which when executed by the electronic device, causes the electronic device to perform second operations comprising:
   selecting, based on the AI data, second NN setting information paired with the selected first NN setting information, from a plurality of second NN setting information for the AI up-scaling that are stored in the electronic device; and
   obtaining, by an up-scaling NN, the third image by performing the AI up-scaling on the obtained second image, the up-scaling NN being set with the selected second NN setting information,
   wherein the plurality of first NN setting information and the plurality of second NN setting information are obtained through joint training of the up-scaling NN and the down-scaling NN.

* * * * *